United States Patent
Andreasen et al.

(10) Patent No.: US 9,049,046 B2
(45) Date of Patent: Jun. 2, 2015

(54) SYSTEM AND METHOD FOR OFFLOADING DATA IN A COMMUNICATION SYSTEM

(75) Inventors: Flemming S. Andreasen, Marlboro, NJ (US); Kent K. Leung, Palo Alto, CA (US); Michel Khouderchah, Cupertino, CA (US); Jayaraman R. Iyer, San Jose, CA (US); Timothy P. Stammers, Raleigh, NC (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 0 days.

(21) Appl. No.: 13/179,539

(22) Filed: Jul. 10, 2011

(65) Prior Publication Data
US 2012/0082093 A1 Apr. 5, 2012

Related U.S. Application Data

(60) Provisional application No. 61/389,971, filed on Oct. 5, 2010.

(30) Foreign Application Priority Data

Jul. 16, 2010 (FR) ..................... 10 03001

(51) Int. Cl.
*H04W 4/00* (2009.01)
*H04L 12/46* (2006.01)
(Continued)

(52) U.S. Cl.
CPC ....... *H04L 12/4633* (2013.01); *H04L 29/12367* (2013.01); *H04L 45/22* (2013.01); *H04L 61/2514* (2013.01); *H04W 40/24* (2013.01)

(58) Field of Classification Search
USPC .................. 370/329, 338, 235, 466
See application file for complete search history.

(56) References Cited

U.S. PATENT DOCUMENTS 5,151,899 A 9/1992 Thomas et al.
5,371,731 A 12/1994 Pratt et al.
(Continued)

FOREIGN PATENT DOCUMENTS

EP 1250022 10/2002
EP 1619917 1/2006
(Continued)

OTHER PUBLICATIONS

Ericsson, Tdoc S2-000888; "SGSN decomposition," Document for discussion; R000 Architecture; 3GPP TSG SA2 Meeting #13; Berlin, $22^{nd}$-$26^{th}$ May 2000, 13 pages; http://www.3gpp.org/ftp/tsg_sa/WG2_Arch/TSGS2_13/tdocs/S2-000888.zip.
(Continued)

*Primary Examiner* — Helal A Algahaim
*Assistant Examiner* — Mahmoud Ismail
(74) *Attorney, Agent, or Firm* — Patent Capital Group

(57) ABSTRACT

A method is provided in one example embodiment and includes communicating an in-band message packet from a first network element; receiving a response to the in-band message from a second network element, the response contains tunnel identification binding data that identifies a tunnel on a backhaul link on which traffic from a user equipment can flow; and receiving instructions from the second network element to offload a received data packet from the backhaul link. In particular instances, the in-band message is set to loopback when the in-band message is sent from the first network element. In other embodiments, the tunnel identification binding data is provided in the payload of the in-band message when the in-band message is sent from the first network element. In other examples, the method can include receiving an assigned Internet protocol (IP) address of the user equipment in the response to the in-band message.

21 Claims, 26 Drawing Sheets

(51) Int. Cl.

| | | |
|---|---|---|
| H04J 3/16 | (2006.01) | |
| H04J 3/22 | (2006.01) | |
| H04J 1/16 | (2006.01) | |
| H04J 3/14 | (2006.01) | |
| H04L 1/00 | (2006.01) | |
| H04L 12/26 | (2006.01) | |
| H04L 29/12 | (2006.01) | |
| H04L 12/707 | (2013.01) | |
| H04W 40/24 | (2009.01) | |

(56) References Cited

U.S. PATENT DOCUMENTS

| | | | |
|---|---|---|---|
| 5,898,713 | A | 4/1999 | Melzer et al. |
| 6,496,516 | B1 | 12/2002 | Dabecki et al. |
| 6,522,880 | B1 | 2/2003 | Verma et al. |
| 6,643,621 | B1 | 11/2003 | Dodrill et al. |
| 6,654,792 | B1 | 11/2003 | Verma et al. |
| 6,684,256 | B1 | 1/2004 | Warrier et al. |
| 6,728,266 | B1 | 4/2004 | Sabry et al. |
| 6,829,242 | B2 | 12/2004 | Davison et al. |
| 6,839,767 | B1 | 1/2005 | Davies et al. |
| 6,862,624 | B2 | 3/2005 | Colby et al. |
| 6,917,592 | B1 | 7/2005 | Ramankutty et al. |
| 6,922,411 | B1 | 7/2005 | Taylor |
| 6,968,389 | B1 | 11/2005 | Menditto et al. |
| 7,317,693 | B1 | 1/2008 | Roesch et al. |
| 7,366,189 | B2 | 4/2008 | Davison et al. |
| 7,426,202 | B2 | 9/2008 | Warrier et al. |
| 7,447,765 | B2 | 11/2008 | Aerrabotu et al. |
| 7,496,662 | B1 | 2/2009 | Roesch et al. |
| 7,502,836 | B1 | 3/2009 | Menditto et al. |
| 7,522,521 | B2 | 4/2009 | Bettink et al. |
| 7,610,330 | B1 | 10/2009 | Quinn et al. |
| 7,673,072 | B2 | 3/2010 | Boucher et al. |
| 7,742,399 | B2 | 6/2010 | Pun |
| 7,768,983 | B2 | 8/2010 | Nylander et al. |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |
| 7,925,709 | B1 | 4/2011 | Ben-Yoseph et al. |
| 7,926,071 | B2 | 4/2011 | Stephens et al. |
| 7,929,442 | B2 | 4/2011 | Connor et al. |
| 7,990,993 | B1 | 8/2011 | Ghosh et al. |
| 8,018,866 | B1 | 9/2011 | Kasturi et al. |
| 8,086,253 | B1 | 12/2011 | Kalamkar et al. |
| 8,279,776 | B1 | 10/2012 | Everson et al. |
| 8,339,959 | B1 | 12/2012 | Moisand et al. |
| 2002/0046264 | A1 | 4/2002 | Dillon et al. |
| 2002/0053029 | A1 | 5/2002 | Nakamura et al. |
| 2003/0028433 | A1 | 2/2003 | Merriman et al. |
| 2003/0028644 | A1 | 2/2003 | Maguire et al. |
| 2003/0039237 | A1 | 2/2003 | Forslow |
| 2003/0058872 | A1 | 3/2003 | Berggreen et al. |
| 2003/0097481 | A1 | 5/2003 | Richter |
| 2004/0054925 | A1 | 3/2004 | Etheridge et al. |
| 2004/0088385 | A1 | 5/2004 | Blanchet et al. |
| 2004/0224678 | A1 | 11/2004 | Dahod et al. |
| 2004/0236855 | A1 | 11/2004 | Peles |
| 2005/0013253 | A1 | 1/2005 | Lindskog et al. |
| 2005/0025152 | A1 | 2/2005 | Georgiou et al. |
| 2005/0058153 | A1* | 3/2005 | Santhoff et al. ............. 370/466 |
| 2005/0074005 | A1 | 4/2005 | Okuno |
| 2005/0088974 | A1* | 4/2005 | Savoor et al. ............... 370/235 |
| 2005/0091371 | A1 | 4/2005 | Delegue et al. |
| 2005/0096016 | A1 | 5/2005 | Tervo et al. |
| 2005/0120091 | A1 | 6/2005 | Casais et al. |
| 2005/0147069 | A1 | 7/2005 | Rink et al. |
| 2005/0239473 | A1 | 10/2005 | Pan et al. |
| 2005/0246346 | A1 | 11/2005 | Gerdes et al. |
| 2005/0286504 | A1 | 12/2005 | Kwon |
| 2006/0018328 | A1 | 1/2006 | Mody et al. |
| 2006/0029084 | A1 | 2/2006 | Grayson |
| 2006/0058021 | A1 | 3/2006 | Fox et al. |
| 2006/0098573 | A1 | 5/2006 | Beer et al. |
| 2006/0164992 | A1 | 7/2006 | Brown et al. |
| 2006/0222086 | A1 | 10/2006 | Frye |
| 2006/0234678 | A1 | 10/2006 | Juitt et al. |
| 2006/0256722 | A1 | 11/2006 | Taha et al. |
| 2006/0268901 | A1 | 11/2006 | Choyi et al. |
| 2006/0291388 | A1 | 12/2006 | Amdahl et al. |
| 2007/0014245 | A1 | 1/2007 | Aloni et al. |
| 2007/0027992 | A1 | 2/2007 | Judge et al. |
| 2007/0067839 | A1 | 3/2007 | Hamada et al. |
| 2007/0078955 | A1 | 4/2007 | Siliquini et al. |
| 2007/0097983 | A1 | 5/2007 | Nylander et al. |
| 2007/0101421 | A1 | 5/2007 | Wesinger et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0201383 | A1 | 8/2007 | Ong et al. |
| 2007/0208820 | A1 | 9/2007 | Makhervaks et al. |
| 2007/0243872 | A1 | 10/2007 | Gallagher et al. |
| 2007/0253328 | A1 | 11/2007 | Harper et al. |
| 2007/0271453 | A1 | 11/2007 | Pohja et al. |
| 2007/0298848 | A1 | 12/2007 | Babin |
| 2008/0010354 | A1 | 1/2008 | Sasaki et al. |
| 2008/0026740 | A1 | 1/2008 | Netanel |
| 2008/0045267 | A1 | 2/2008 | Hind et al. |
| 2008/0114862 | A1 | 5/2008 | Moghaddam et al. |
| 2008/0133518 | A1 | 6/2008 | Kapoor et al. |
| 2008/0137541 | A1 | 6/2008 | Agarwal et al. |
| 2008/0147837 | A1 | 6/2008 | Klein et al. |
| 2008/0162637 | A1 | 7/2008 | Adamczyk et al. |
| 2008/0176582 | A1 | 7/2008 | Ghai et al. |
| 2008/0177880 | A1 | 7/2008 | Ginis |
| 2008/0188223 | A1 | 8/2008 | Vesterinen et al. |
| 2008/0298309 | A1 | 12/2008 | DePietro et al. |
| 2008/0301254 | A1 | 12/2008 | Bestler |
| 2008/0310404 | A1 | 12/2008 | Valme et al. |
| 2008/0316980 | A1 | 12/2008 | Ahlen et al. |
| 2009/0017864 | A1 | 1/2009 | Keevill et al. |
| 2009/0061821 | A1 | 3/2009 | Chen et al. |
| 2009/0061873 | A1 | 3/2009 | Bao et al. |
| 2009/0067417 | A1 | 3/2009 | Kalavade et al. |
| 2009/0086742 | A1 | 4/2009 | Ghai et al. |
| 2009/0089447 | A1 | 4/2009 | Balachandran et al. |
| 2009/0092136 | A1 | 4/2009 | Nazareth et al. |
| 2009/0098872 | A1 | 4/2009 | Deshpande et al. |
| 2009/0109849 | A1 | 4/2009 | Wood et al. |
| 2009/0109982 | A1 | 4/2009 | Batz et al. |
| 2009/0129271 | A1 | 5/2009 | Ramankutty et al. |
| 2009/0156213 | A1 | 6/2009 | Spinelli et al. |
| 2009/0161680 | A1 | 6/2009 | Ishikawa et al. |
| 2009/0164597 | A1 | 6/2009 | Shuster |
| 2009/0207759 | A1 | 8/2009 | Andreasen et al. |
| 2009/0215438 | A1 | 8/2009 | Mittal et al. |
| 2009/0254658 | A1 | 10/2009 | Kamikura et al. |
| 2009/0262682 | A1 | 10/2009 | Khetawat et al. |
| 2009/0279522 | A1 | 11/2009 | Leroy et al. |
| 2009/0286510 | A1 | 11/2009 | Huber et al. |
| 2009/0307746 | A1 | 12/2009 | Di et al. |
| 2010/0010991 | A1 | 1/2010 | Joshi |
| 2010/0067462 | A1* | 3/2010 | Beser et al. ................... 370/329 |
| 2010/0077102 | A1 | 3/2010 | Lim et al. |
| 2010/0082787 | A1 | 4/2010 | Kommula et al. |
| 2010/0091653 | A1 | 4/2010 | Koodli et al. |
| 2010/0091775 | A1 | 4/2010 | Yamamoto |
| 2010/0103871 | A1 | 4/2010 | Mooney et al. |
| 2010/0124933 | A1 | 5/2010 | Chowdhury et al. |
| 2010/0131646 | A1 | 5/2010 | Drako |
| 2010/0174829 | A1 | 7/2010 | Drako |
| 2010/0186064 | A1 | 7/2010 | Huang et al. |
| 2010/0195640 | A1 | 8/2010 | Park et al. |
| 2010/0278070 | A1 | 11/2010 | Melia et al. |
| 2010/0291897 | A1 | 11/2010 | Ghai et al. |
| 2011/0021192 | A1 | 1/2011 | Grayson et al. |
| 2011/0021196 | A1 | 1/2011 | Grayson et al. |
| 2011/0058479 | A1 | 3/2011 | Chowdhury et al. |
| 2011/0069663 | A1 | 3/2011 | Shu et al. |

(56) References Cited

U.S. PATENT DOCUMENTS

| | | | |
|---|---|---|---|
| 2011/0075557 | A1 | 3/2011 | Chowdhury et al. |
| 2011/0075675 | A1 | 3/2011 | Koodli et al. |
| 2011/0076985 | A1 | 3/2011 | Chami et al. |
| 2011/0116377 | A1 | 5/2011 | Batz et al. |
| 2011/0122870 | A1 | 5/2011 | Dixon et al. |
| 2011/0145103 | A1 | 6/2011 | Ljunggren et al. |
| 2011/0145111 | A1 | 6/2011 | Ljundren et al. |
| 2011/0182249 | A1 | 7/2011 | Yang et al. |
| 2011/0185049 | A1 | 7/2011 | Atreya et al. |
| 2011/0225284 | A1 | 9/2011 | Savolainen |
| 2011/0235546 | A1 | 9/2011 | Horn et al. |
| 2011/0235595 | A1 | 9/2011 | Mehta et al. |
| 2011/0295942 | A1 | 12/2011 | Raghunath et al. |
| 2012/0002543 | A1 | 1/2012 | Dighe et al. |
| 2012/0076120 | A1* | 3/2012 | Kovvali et al. ............ 370/338 |
| 2012/0082073 | A1 | 4/2012 | Andreasen et al. |
| 2012/0082094 | A1 | 4/2012 | Andreasen et al. |
| 2012/0082132 | A1 | 4/2012 | Andreasen et al. |
| 2012/0082146 | A1 | 4/2012 | Andreasen et al. |
| 2012/0082161 | A1 | 4/2012 | Leung et al. |
| 2012/0184258 | A1 | 7/2012 | Kovvali et al. |
| 2012/0224536 | A1 | 9/2012 | Hahn et al. |
| 2013/0003741 | A1 | 1/2013 | Singh et al. |
| 2013/0041934 | A1 | 2/2013 | Annamalaisami et al. |
| 2013/0058274 | A1 | 3/2013 | Scherzer et al. |
| 2013/0258963 | A1 | 10/2013 | Mihaly et al. |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO 2005/015825 | 2/2005 |
| WO | WO 2009/089455 | 7/2009 |
| WO | WO 2009/132700 | 11/2009 |
| WO | WO2011/062745 | 5/2011 |
| WO | WO2011/062746 | 5/2011 |

OTHER PUBLICATIONS

3GPP Organizational Partners, $3^{rd}$ Generation Partnership Project; Technical Specification Group Services and System Aspects; IP flow mobility and seamless Wireless Local Area Network (WLAN) offload; Stage 2 (Release 10); 3GPP TS 23.261 V10.1.0 (Sep. 2010) ©2010, 22 pages; http://www.3gpp.org.

3GPP Organizational Partners, $3^{rd}$ Generation Partnership Project; Technical Specification Group Services and System Aspects; Local IP Access and Selected IP Traffic Offload (LIPA-SIPTO) (Release 10); 3GPP TR 23.829 V10.0.0 (Mar. 2011) ©2011, 43 pages; http://www.3gpp.org.

"$3^{rd}$ Generation Partnership Project; Technical Specification Group Core Network and Terminals; Policy and Charging Control over Gx reference point (Release 9)," 3GPP Standard; 3GPP TS 29.212, $3^{rd}$ Generational Partnership Project (3GPP), Mobile Competence Centre; 650, Route Des Lucioles; F-06921 Sophia-Antipolis Cedex; France, No. V9.0.0, Sep. 1, 2009; 92 pages.

3GPP TS.23.203 v.11.3.0 Technical Specification—"3rd Generation Partnership Project; Technical Specification Group Services and System Aspects; Policy and Charging control architecture (Release 11)," Sep. 2011; 167 pages.

3GPP TS.23.401 v.10.5.0 Technical Specification—"3rd General Partnership Project; Technical Specification Group Services and System Aspects: General Packet Radio Service (GPRS) enhancements for Evolved Universal Terrestrial Radio Access Network (E-UTRAN) access (Release 10)," Sep. 2011, 284 pages.

3GPP TS 23.236 v.10.0.0 Technical Specification—"3rd General Partnership Project; Technical Specification Group Services and Systems Aspects; Intra-Domain Connection of Radio Access Network (RAN) Nodes to Multiple Cor Network (CN) Nodes (Release 10)," Mar. 2010, 39 pages.

Chowdhury, K. "Fast Handoff Support for HRPD," 3rd Generation Partnership Project 2, 3GPP2, Apr. 24, 2006.

Chowdhury, K. "Network-Based Layer 3 Connectivity and Mobility Management for IPv6," draft-chowdbury-netmip6-01.txt, Network Working Group Internet Draft, Sep. 8, 2006, 20 pages http://tools.ietf.org/html/draft-chowdbury-netmip6-01.

Chowdhury, K., "Network Based L3 Connectivity and Mobility Management for IPv4," draft-chowdbury-netmip4-001.tt, Feb. 25, 2006; 16 pages http://tools.ietf.org/html/draft-chowdbury-netmip4-00.

Cisco Systems, Inc., "Cisco Application-Oriented Networking," © 1992-2006; 10 pages http://www.cisco.com/en/US/prod/collateral/modules/ps6438/product_data_sheet0900aecd802c1f9c.html.

Cisco Systems, Inc., "Cisco NAC Appliance—Clean Access Manager Installation and Configuration Guide," Jul. 2009, 5 pages http://www.cisco.com/en/US/docs/securty/nac/appliance/configuration_guide/461/cam/cam46lug.pdf.

Cisco Systems, Inc., "Cisco NAC Appliance—Clean Access Server Installation and Configuration Guide, Rel. 4.6 (1)," Jul. 2009, 3 pages http://www.cisco.com/en/US/docs/security/nac/appliance/configuration_guide/461/cas/cas461ug.pdf.

Cisco Systems, Inc., Configuring URL Routing (L5 Routing) on the CSS 11000 and 11500, © 1992-2006; Document ID: 25999; 5 pages http://www.cisco.com/en/US/products/hw/contnetw/ps792/products_configuration_example09186a00801cOdbc.shtml.

Devarapalli, V., et al., "Proxy Mobile IPv6 and Mobil IPv6 Interworking," draft-devarapallinetlmm-pmipv6-mipv6-00.txt, NETLMM Working Group Internet Draft, Apr. 10, 2007; 9 pages http://tools,ietf.org/html/draft-devarapalli-netImm-pmipv6-mipv6-00.

Lior, A., et al., "Mobile IP Key Derivation using EAP," draft-lior-mipkeys-eap-00, Network Working Group, Feb. 25, 2006; 17 pages http://tools.ietf.org/html/draft-lior-mipkeys-eap-00.

Navali, J., et al., "IPv6 over Network based Mobile IPv4," draft-navali-ip6-over-netmip4-00.txt, Network Working Group, Feb. 25, 2006; 20 pages http://tools.ietf.org/html/draft-navali-ip6-over-netmip4-00.

PCT 2011-3-1 Notification of Transmittal (1 page) of the International Search Report (4 pages) and the Written Opinion of the International Searching Authority, or the Declaration (6 pages) for PCT/US2010/054834.

PCT 2012-5-31 International Preliminary Report on Patentability and Written Opinion of the International Searching Authority (8 pages) for PCT/US2010/054834.

PCT 2011-2-8 Notification of Transmittal (1 page) of the International Search Report (4 pages) and the Written Opinion of the International Searching Authority, or the Declaration (7 pages) for PCT/US2010/054838.

PCT 2012-5-30 International Preliminary Report on Patentability and Written Opinion of the International Searching Authority (8 pages) for PCT/US2010/054838.

"3GPP TS 23.203 V9.2.0 (Sep. 2009) Technical Specification $3^{rd}$ Generation Partnership project; Technical Specification Group Services and System Aspects; Policy and Charging Control Architecture (Release 9)," 3GPP TS 23.203 V9.2.0, vol. 23, 203, No. V9.2.0; Sep. 1, 2009, 120 pages; URL:ftp://ftp.3.gpp.org/specs/archive/23_series/23.203/.

User Agent Profile (UAProf) Specification, Wireless Application Group, Wireless Application Protocol Forum, Version 10, Nov. 1999, 76 pages.

EPO Aug. 22, 2012 Response to Communication re Rules 161(1) and 162 EPC from European Application No. 10779130; 8 pages.

U.S. Appl. No. 12/642,790 filed Dec. 19, 2009, entitled "System and Method for Managing Out of Order Packets in a Network Environment," Inventor(s): Walter Dixon et al.

U.S. Appl. No. 12/621,114 filed Nov. 18, 2009, entitled "System and Method for Inspecting Domain Name System Flows in a Network Environment," Inventor(s): Robert Batz et al.

U.S. Appl. No. 12/642,791 filed Dec. 19, 2009, entitled "System and Method for Providing Subscriber Aware Routing in a Network Environment," Inventor(s): Shmuel Shaffer.

U.S. Appl. No. 12/984,034 filed Jan. 4, 2011, entitled "System and Method for Exchanging Information in a Mobile Wireless Network Environment," Inventors: Gary B. Mahaffey, et al.

(56) References Cited

OTHER PUBLICATIONS

U.S. Appl. No. 13/159,906 filed Jun. 14, 2011, entitled "Selective Packet Sequence Acceleration in a Network Environment," Inventor(s): Bhagatram Janarthanan et al.
U.S. Appl. No. 13/160,189 filed Jun. 14, 2011, entitled "Preserving Sequencing During Selective Packet Acceleration in a Network Environment," Inventor(s): Bhagatram Janarthanan et al.
U.S. Appl. No. 13/160,344 filed Jun. 14, 2011, entitled "Accelerated Processing of Aggregate Data Flows in a Network Environment," Inventor(s): Imnaz Meher Jilani et al.
U.S. Appl. No. 13/160,426 filed Jun. 14, 2011, entitled "Selective Packet Sequence Acceleration in a Network Environment," Inventor(s): Bhagatram Janarthanan.
3GPP TR 25.820 v8.0.0 (Mar. 2008), 3rd Generation Partnership Project; Technical Specification Group Radio Access Networks; 3G Home NodeB Study Item Technical Report (Release 8); http://www.3gpp.org, 2008. 37 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.1 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 25.411 v7.1.0 (Sep. 2007); 3rd Generation Partnership Project; Technical Specification Group Radio Access Network; UTRAN Iu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007. 359 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
U.S. Appl. No. 14/260,387 filed Apr. 24, 2014, entitled "System and Method for Managing Out of Order Packets in a Network Environment," Inventor(s): Walter Dixon et al.
U.S. Appl. No. 14/257,098 filed Apr. 21, 2014, entitled "Accelerated Processing of Aggregate Data Flows in a Network Environment," Inventor(s): Imnaz Meher Jilani et al.
U.S. Appl. No. 14/257,131 filed Apr. 21, 2014, entitled "Selective Packet Sequence Acceleration in a Network Environment," Inventor(s): Bhagatram Janarthanan.
PRC Apr. 3, 2014 SIPO First Office Action from Chinese Application No. 201080051408.1.
EPO Oct. 1, 2013 Communication from European Serial No. 10779129.5.
"Stoke Mobile Data Offload Solution Brief," ©2009 Stoke, Inc.; Aug. 2009, 4 pages; [Retrieved and printed Nov. 14, 2013] stoke.com/GetFile.asp?f=a08fed265abc46434edf6763307c1078.
PRC Dec. 12, 2014 SIPO Second Office Action from Chinese Application No. 201080051408.1.

\* cited by examiner

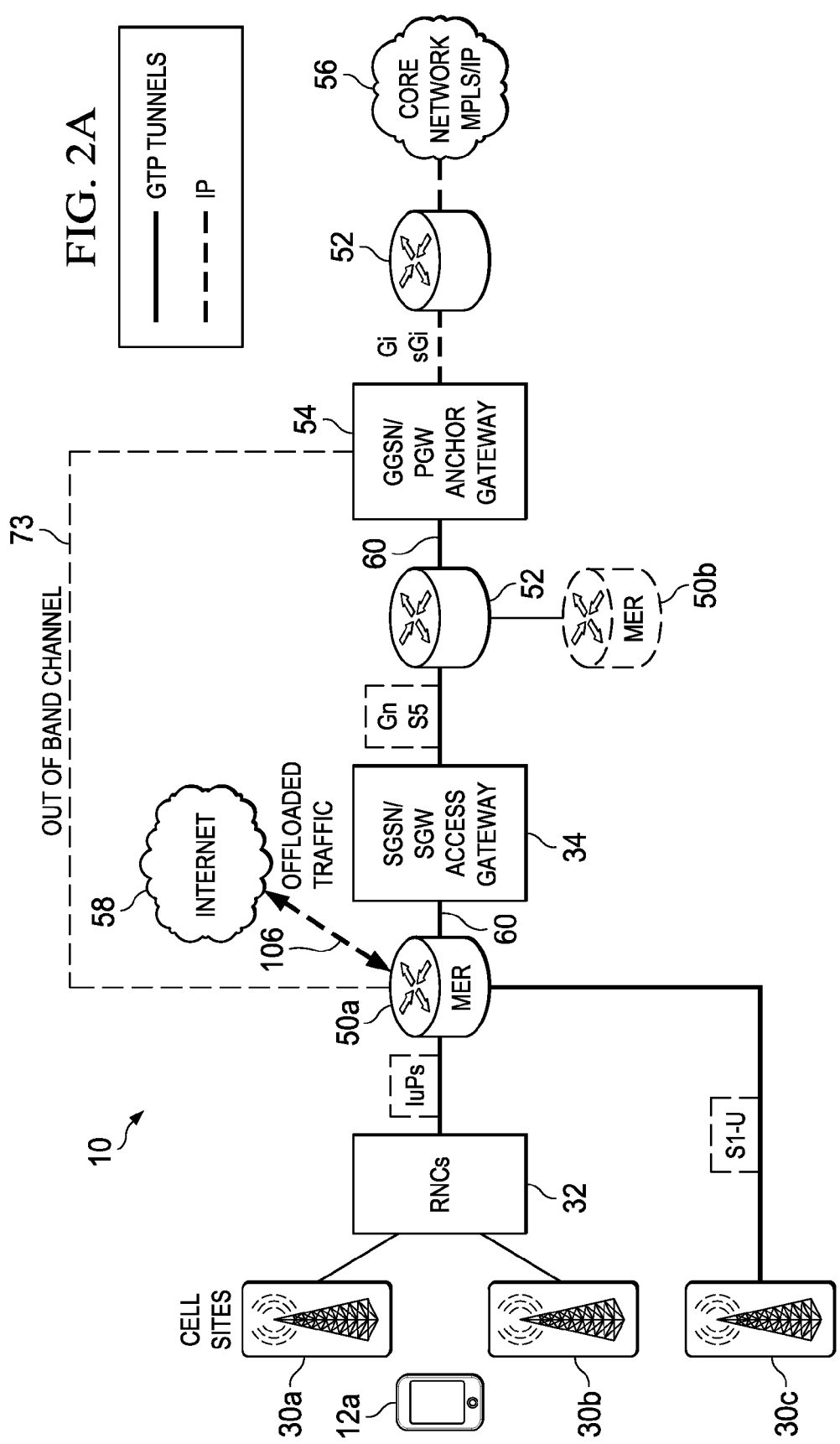

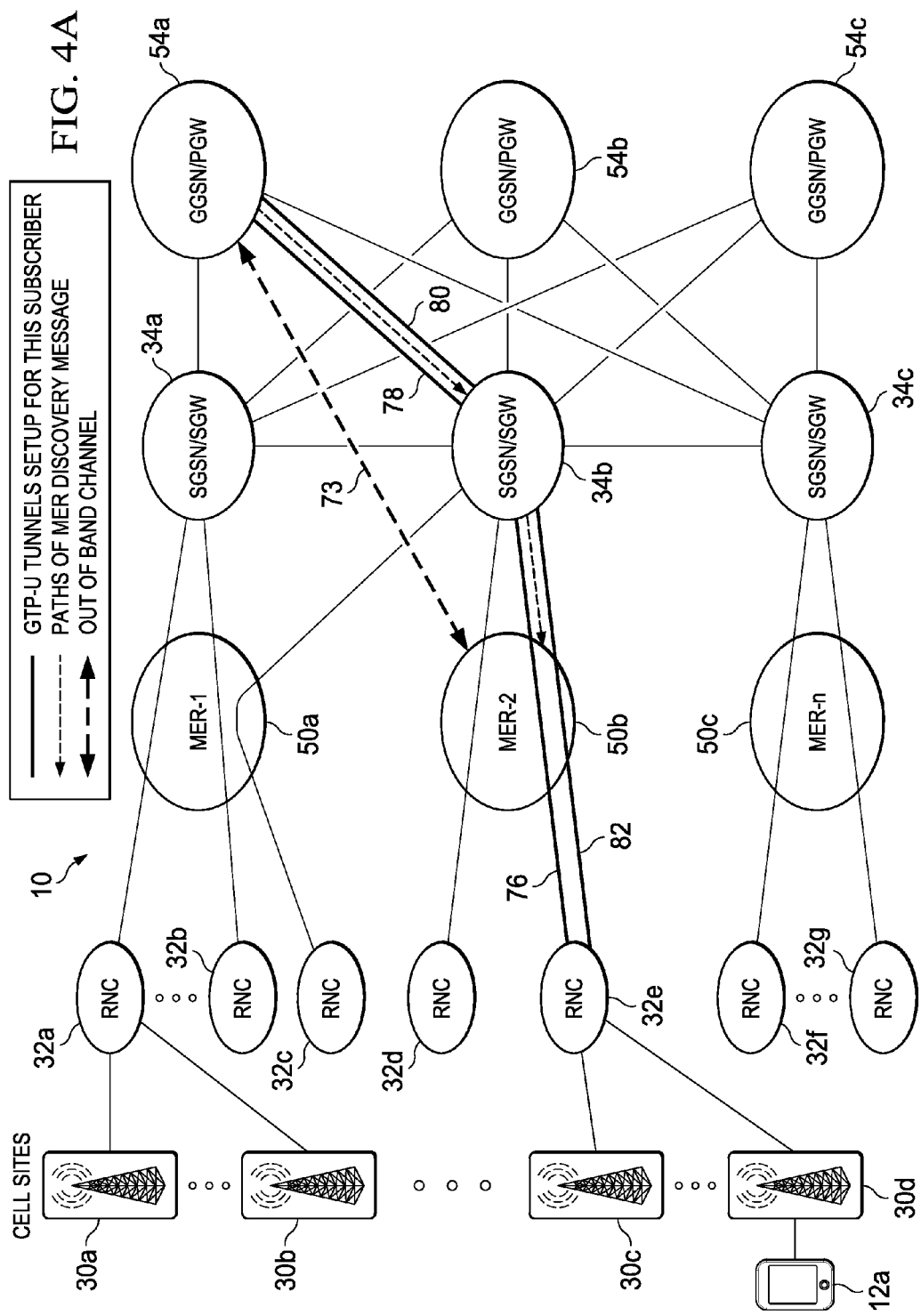

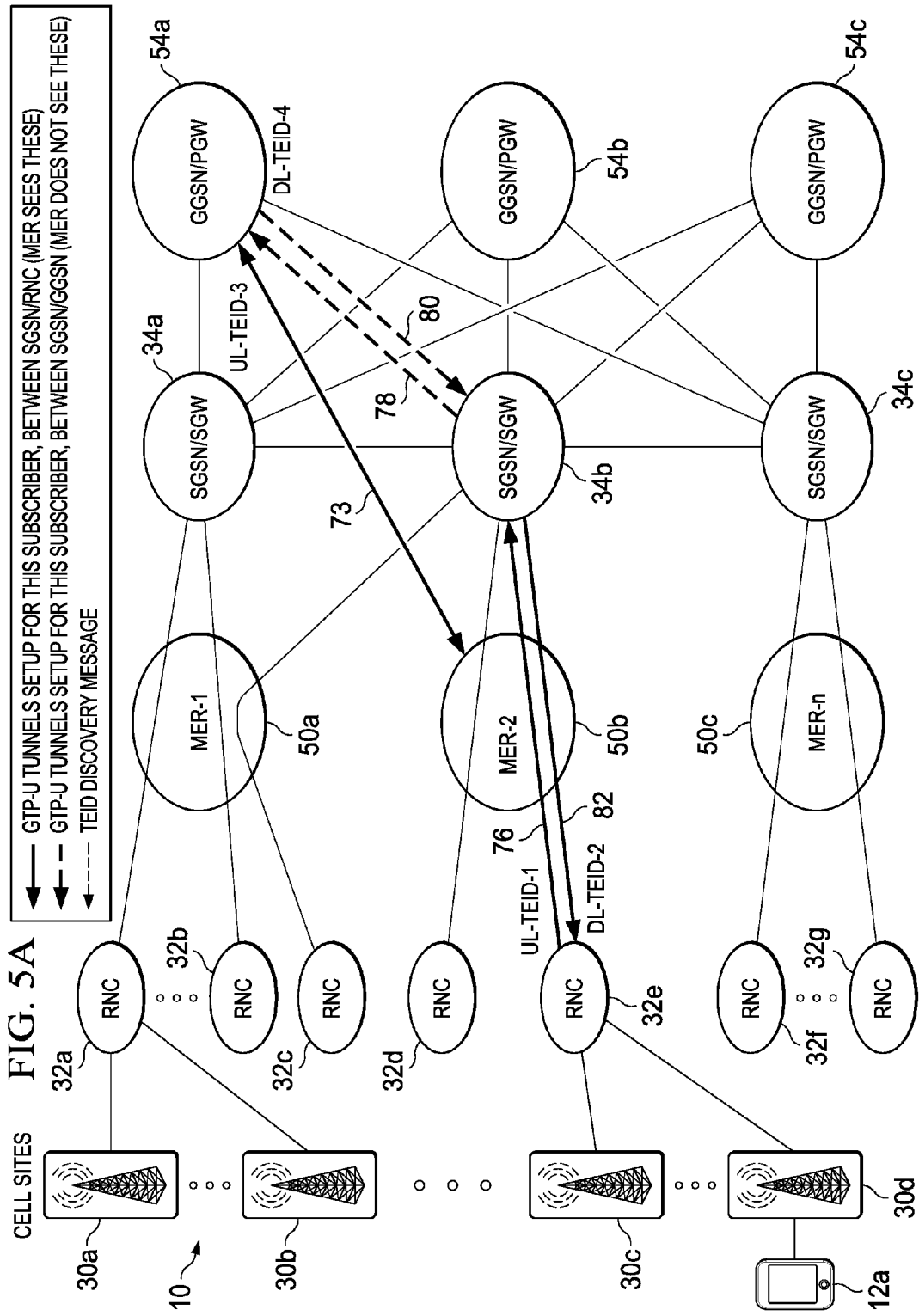

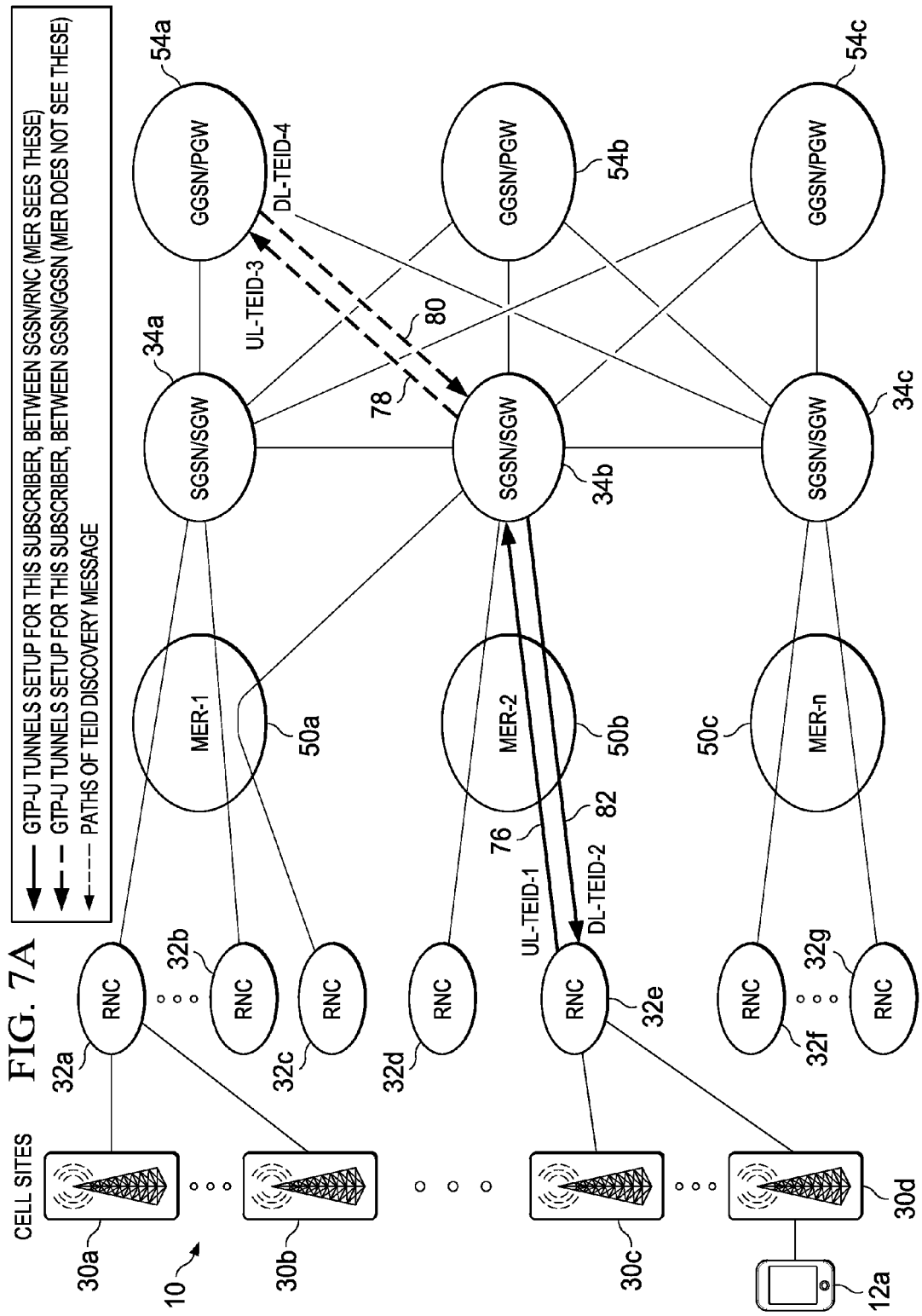

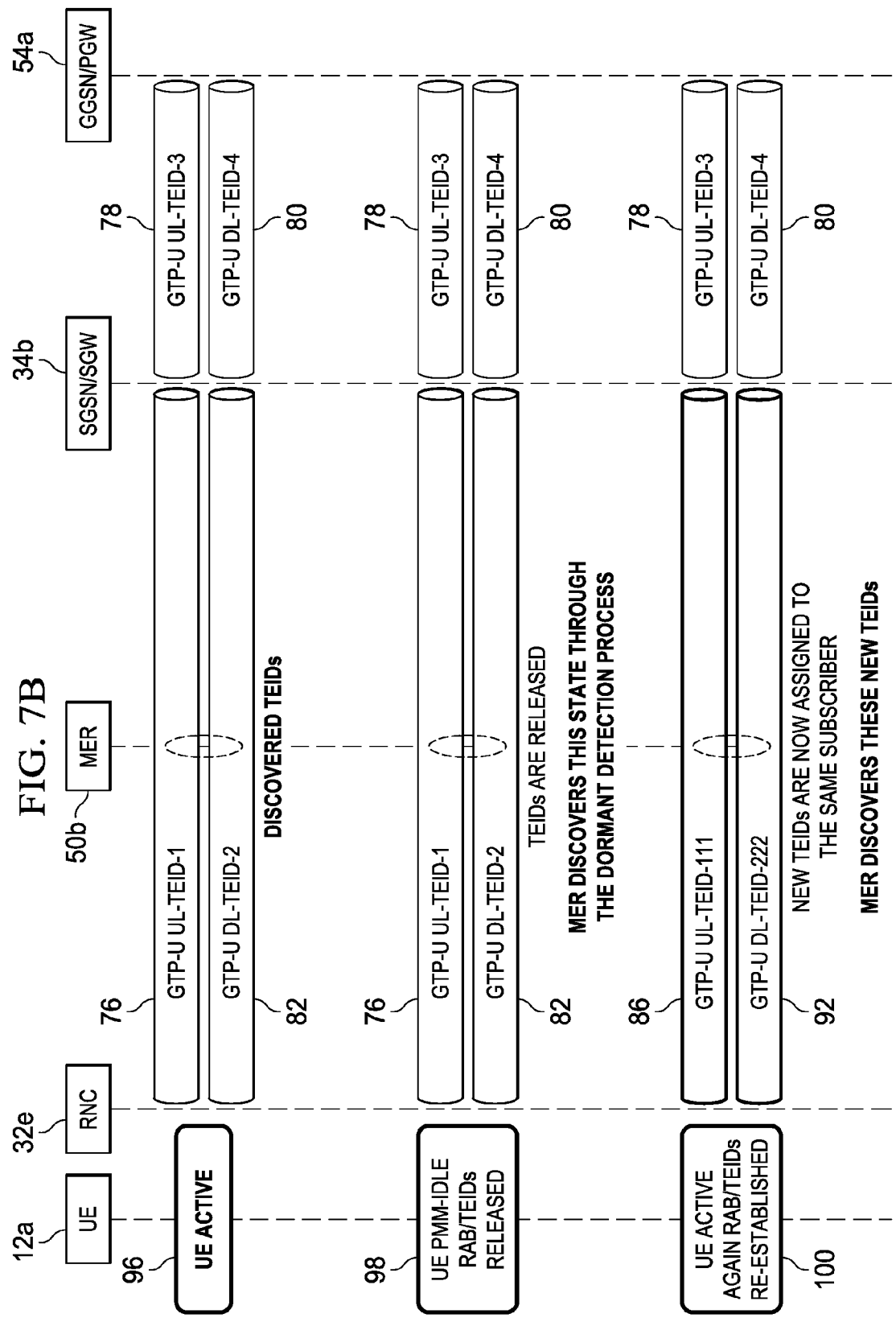

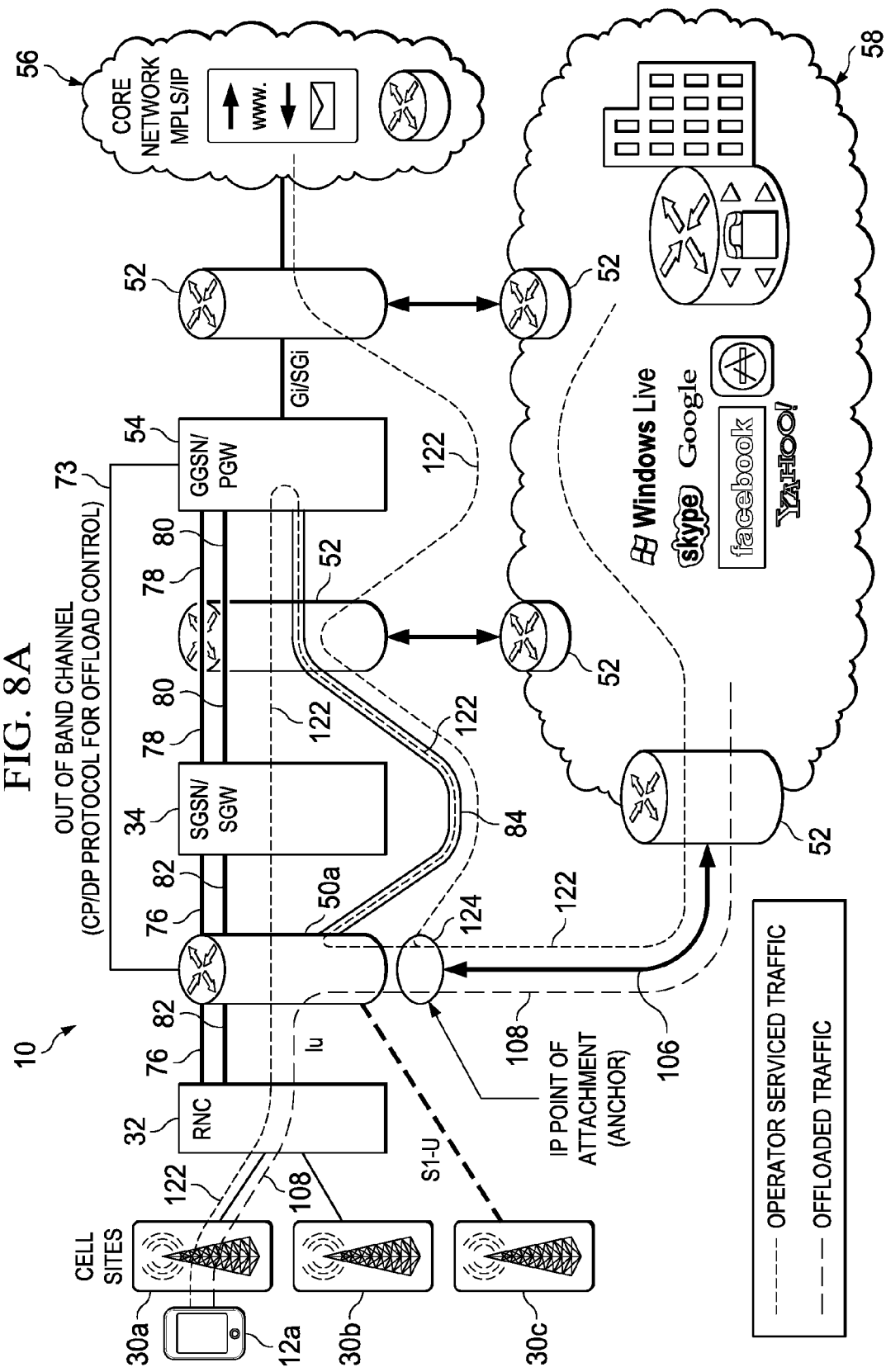

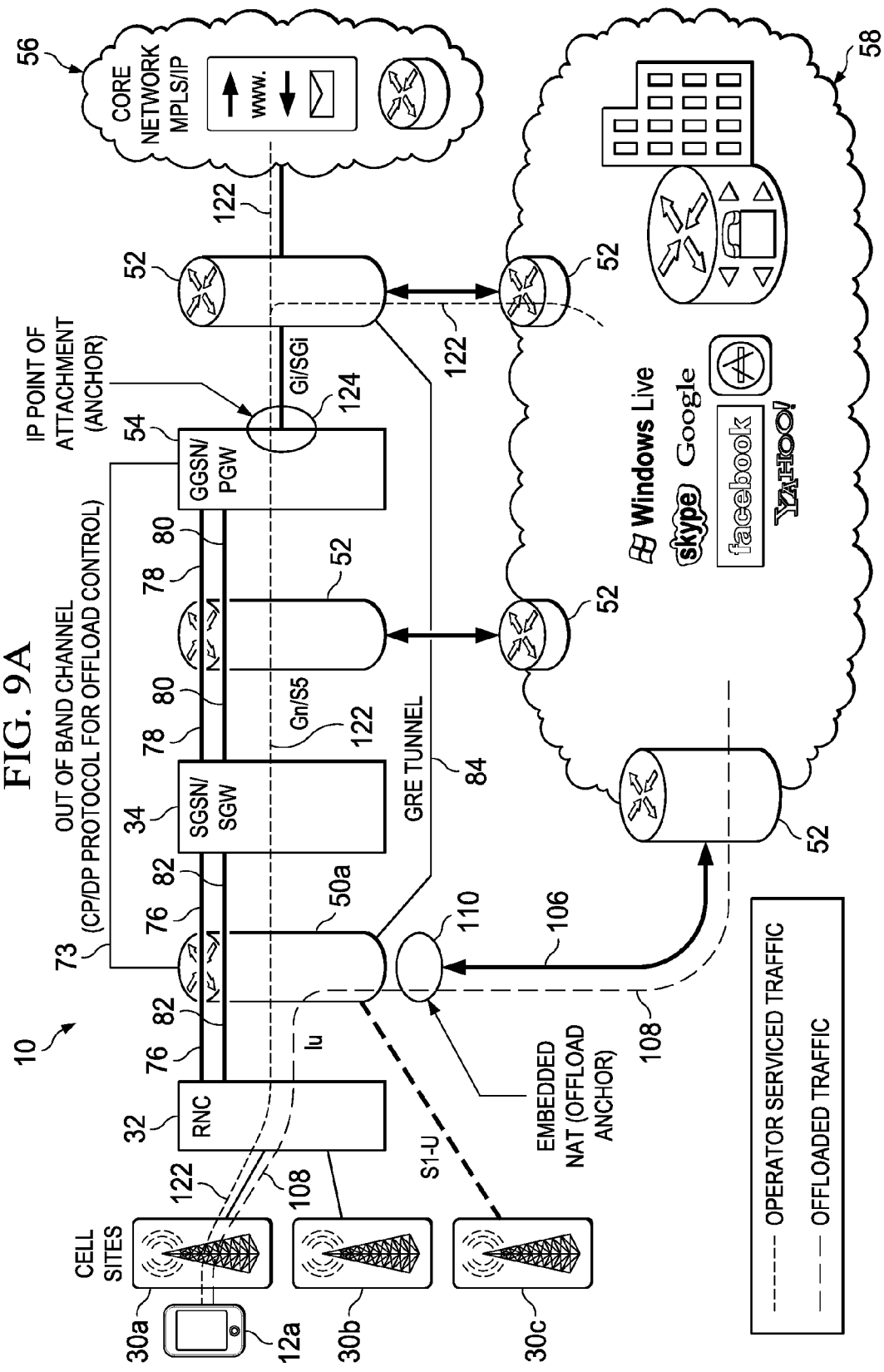

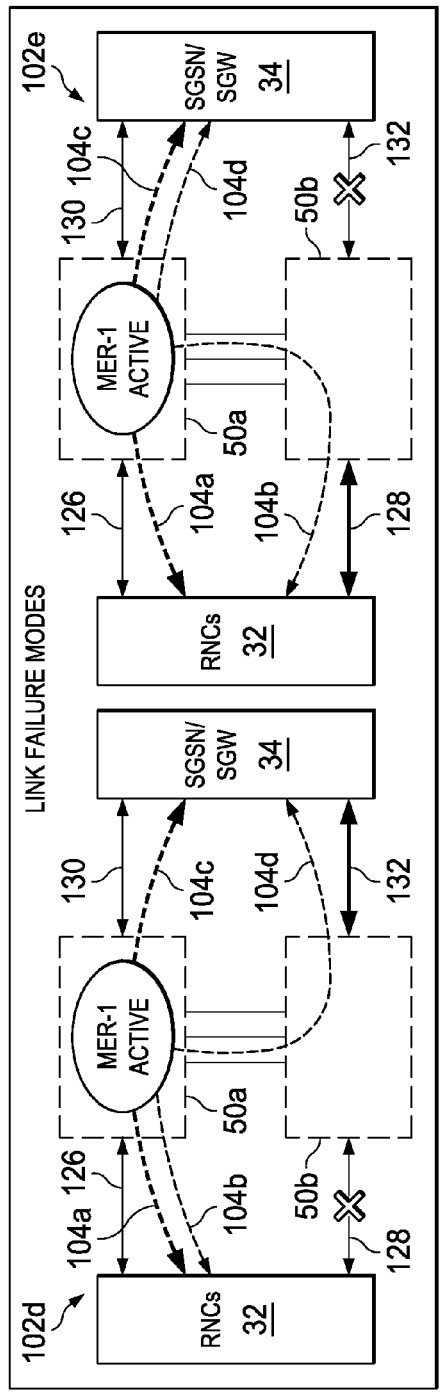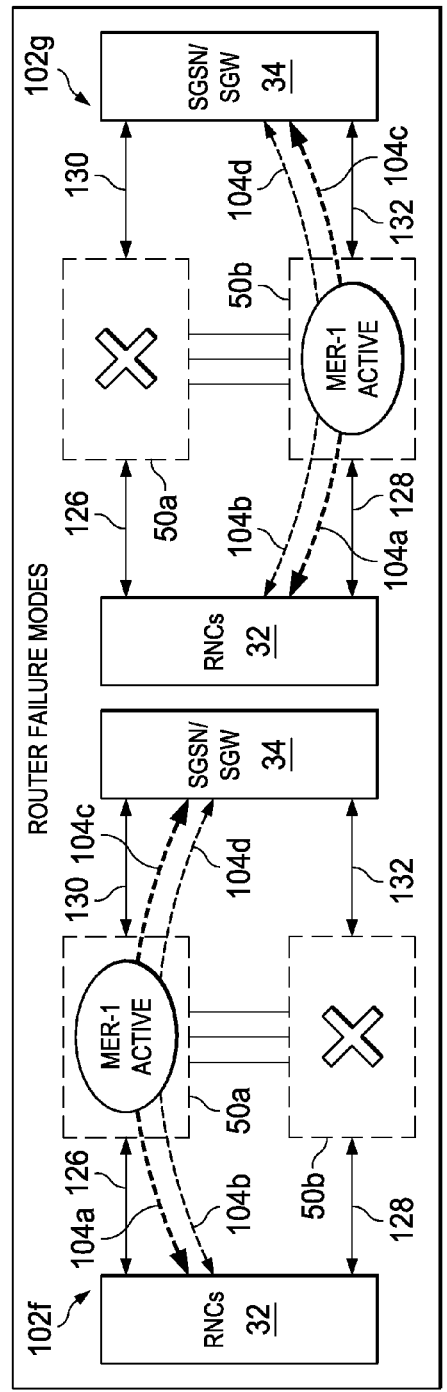

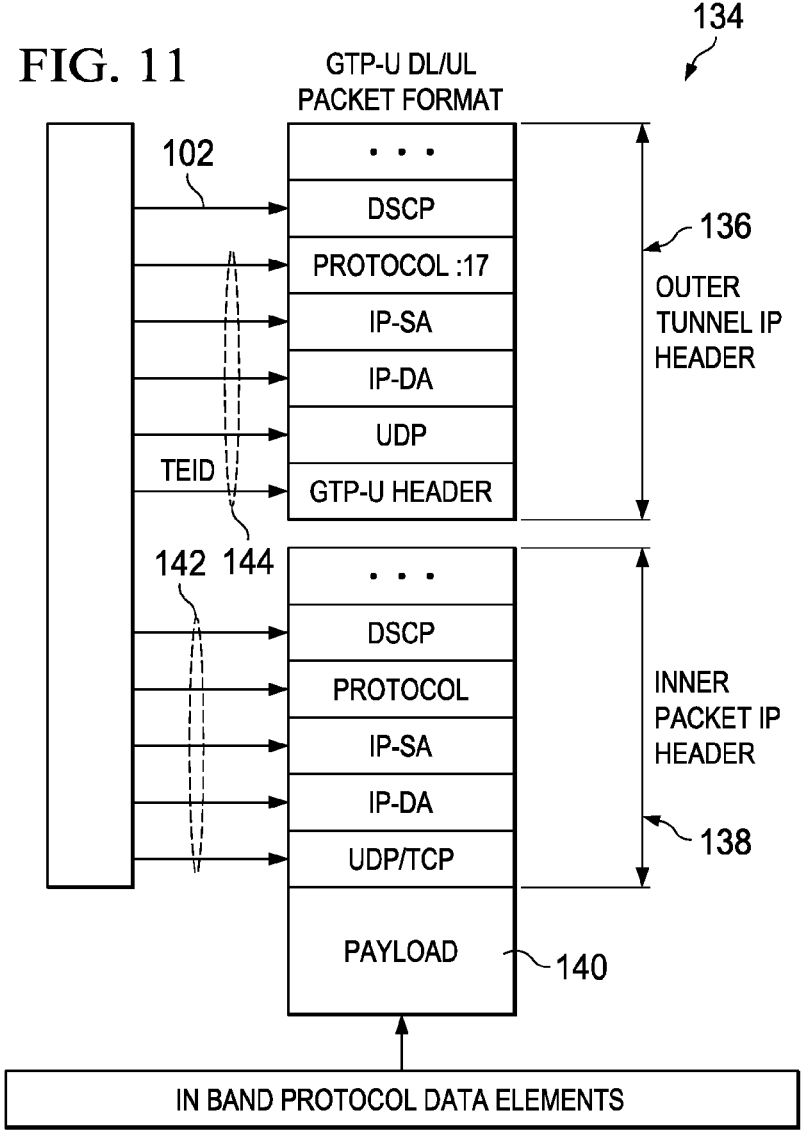

SYSTEM AND METHOD FOR OFFLOADING DATA IN A COMMUNICATION SYSTEM

CROSS-REFERENCE TO RELATED APPLICATION

This application claims the benefit of priority under 35 U.S.C. §119(e) of U.S. Provisional Application Ser. No. 61/389,971, entitled "SYSTEM AND METHOD FOR PROVIDING TRAFFIC OFFLOAD FOR LOGICAL TUNNELS" filed Oct. 5, 2010, which is hereby incorporated by reference in its entirety.

TECHNICAL FIELD

This disclosure relates in general to the field of communications and, more particularly, to offloading data in a communication system.

BACKGROUND

Networking architectures have grown increasingly complex in communications environments: particularly so in mobile wireless environments. Wireless communication technologies can be used in connection with many applications, including satellite communications systems, portable digital assistants (PDAs), laptop computers, mobile devices (e.g., cellular telephones, user equipment), etc. Wireless communication technologies are handling increasing amounts of data traffic volume, and the types of data being transported through mobile wireless networks have changed dramatically. This is in part because mobile devices have become more sophisticated and, further, such devices are able to engage in more data-intensive activities such as streaming content, playing video games, videoconferencing, etc. Video, file-sharing, and other types of data-intensive traffic (more traditionally associated with wired networks) have gradually displaced voice as the dominant traffic in mobile wireless networks. There is a significant challenge in coordinating which flows merit particular processing in order to minimize resources associated with optimally managing network traffic.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a simplified block diagram illustrating possible example details associated with the communication system in accordance with one embodiment of the present disclosure;

FIG. 4A is another simplified block diagram illustrating one potential operation associated with one embodiment of the present disclosure;

FIG. 5A is another simplified block diagram illustrating one potential operation associated with one embodiment of the present disclosure;

FIG. 7A is another simplified block diagram illustrating one potential operation associated with one embodiment of the present disclosure;

FIG. 7B is another simplified flow diagram illustrating potential operations associated with one embodiment of the present disclosure;

FIG. 7C-1 is another simplified flow diagram illustrating potential operations associated with one embodiment of the present disclosure;

FIG. 7C-2 is a continuation of the simplified flow diagram 7C-1 illustrating potential operations associated with one embodiment of the present disclosure;

FIG. 8A is another simplified block diagram illustrating one potential operation associated with one embodiment of the present disclosure;

FIG. 9A is another simplified block diagram illustrating one potential operation associated with one embodiment of the present disclosure;

FIG. 10C is another simplified block diagram illustrating one potential operation associated with one embodiment of the present disclosure;

FIG. 10D is another simplified block diagram illustrating one potential operation associated with one embodiment of the present disclosure;

FIG. 11 is a simplified block diagram illustrating a data packet associated with one embodiment of the present disclosure.

DETAILED DESCRIPTION OF EXAMPLE EMBODIMENTS

Overview

Discovery

Figure 1:
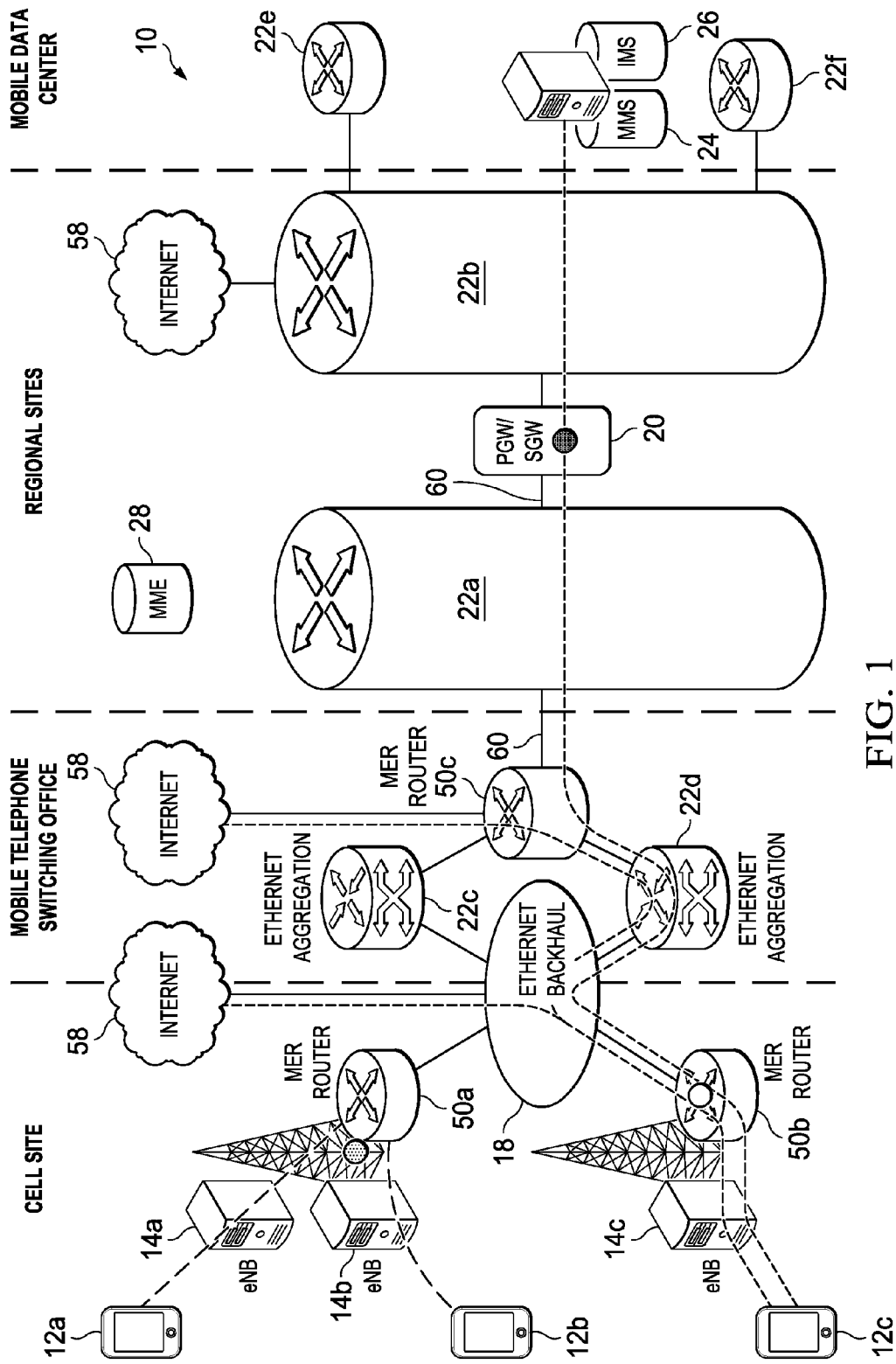
FIG. 1 is a simplified illustrative block diagram of a communication system in accordance with one embodiment of the present disclosure.

A method is provided in one example embodiment and includes receiving a data packet over a first link at a first network element; establishing an out-of-band channel over a second link between the first network element and a second network element; and receiving instructions at the first network element to offload the data packet from the first link. In more particular instances, the first network element can be a mobile enabled router and the second network element can be a gateway general packet radio service support node or a packet data network gateway.

In other examples, the method includes receiving a discovery message from the second network element, the discovery message triggers establishment of the out-of-band channel. Additionally, the data packet can be offloaded based on the type of data in the data packet. In other implementations, predefined classes of traffic are provisioned such that the first network element is configured to map certain classes of traffic to available backhaul links. Additionally, the method may include establishing a generic routing encapsulation (GRE) tunnel between the first network element and the second network element using the out-of-band channel. In other examples, the GRE tunnel is used to loopback traffic to the first network element during handover activities involving a user equipment. Using the out-of-band channel, the first network element can be configured to identify itself, confirm receipt of a discovery request, and obtain session control instructions.

TEID Discovery

A method is provided in one example embodiment and includes communicating an in-band message packet from a first network element; receiving a response to the in-band message from a second network element, where the response may include tunnel identification binding data that identifies a tunnel on a backhaul link on which traffic from a user equipment can flow; and receiving instructions from the second network element to offload a received data packet from the backhaul link. In more particular instances, the in-band message can be set to loopback when the in-band message is sent from the first network element.

In other examples, the tunnel identification binding data is provided in the payload of the in-band message when the in-band message is sent from the first network element. Additionally, the method may include receiving an assigned IP address of the user equipment in the response to the in-band message. In other implementations, the method may include changing an endpoint of the in-band message at a servicing general packet radio service support node or serving gateway and communicating the in-band message to a different network element. Additionally, the second network element can be a gateway general packet radio service support node or a packet data network gateway and the first network element is a mobile enabled router. In other examples, the method may include receiving identification data of the gateway general packet radio service support node in the response to the in-band message.

Dormant

A method is provided in one example embodiment and includes receiving a downstream data packet transported on a backhaul link at a first network element, where the downstream data packet is associated with a user equipment; identifying whether a downstream tunnel used to communicate the data packet to the user equipment has become dormant; and communicating an in-band message to a second network element that the downstream tunnel is dormant. In more particular instances, the method further includes dropping the data packet when a network address port translation binding has expired or does not exist.

In other examples, the method may include identifying the downstream tunnel as dormant when an activity timer has expired. Additionally, the method may include identifying the downstream tunnel as dormant based on a stale state setting. In other implementations, the method may include buffering the data packet after identifying that the downstream tunnel used to communicate the data packet to the user equipment is dormant. In other examples, the method may include receiving a tunnel identification binding that identifies a second tunnel used to communicate the data packet to the user equipment. Additionally, the method may include identifying that an upstream tunnel used to communicate the data packet from the user equipment is dormant and communicating an in-band message to the first network element that the upstream tunnel is dormant.

IP Routing

A method is provided in one example embodiment and includes receiving a data packet transported on a backhaul link at a first network element; de-capsulating the data packet; identifying whether the data packet is an upstream data packet; identifying whether the data packet matches an internet protocol (IP) access control list (ACL) or a tunnel endpoint identifier; and offloading the data packet from the backhaul link. In more particular instances, the method includes identifying that the data packet does not match the internet IP ACL or the tunnel endpoint identifier and communicating the data packet to a second network element.

In other examples, the method includes identifying that the data packet is a downstream data packet, identifying a service to be performed for the data packet that cannot be performed at the first network element, and communicating the data packet to a second network element. Additionally, the method may include assigning an IP address to the data packet and performing a network address translation on the data packet at a gateway general packet radio service support node. In other implementations, the method may include identifying that the data packet is a downstream data packet and restoring tunnel header and tunnel identification based on the IP address of the data packet. Additionally, the method may include performing a general packet radio service tunneling protocol sequencing. In other examples, the method may include identifying that the data packet is a downstream data packet, and communicating the data packet to a radio network controller or an eNode B.

NAT

A method is provided in one example embodiment and includes receiving a data packet transported on a backhaul link at a first network element; identifying whether the data packet is an upstream data packet; identifying whether the data packet matches an IP ACL or a tunnel endpoint identifier; performing a network address translation on the data packet; and offloading the data packet from the backhaul link. In more particular instances, the method may include identifying that the data packet does not match the IP ACL or the tunnel endpoint identifier and communicating the data packet to a second network element.

In other examples, the method may include identifying that the data packet is a downstream data packet and restoring a tunnel header and tunnel identification based on an IP address of the data packet. Additionally, the method may include performing a general packet radio service tunneling protocol sequencing. In other implementations, the method may include identifying that the data packet is a downstream data packet, identifying that a service is to be performed for the data packet that cannot be performed at the first network element, and performing the network address translation on the data packet such that the data packet returns to a second network element. Additionally, the method may include identifying a change to the first network element and performing a network address translation on the data packet such that the data packet returns to a third network element. In other examples, the method may include identifying a carrier grade NAT to operate as an anchor point for particular user equipment traffic, and establishing a tunnel associated with the first network element for the particular user equipment traffic.

Example Embodiments

Turning to FIG. 1, FIG. 1 is a simplified block diagram of an example embodiment of a communication system 10, which can be associated with a mobile wireless network in a particular implementation. The example architecture of FIG. 1 includes multiple instances of user equipment (UE) 12a-c: each of which may connect wirelessly to a respective eNode B (eNB) 14a-c. Each eNB 14a-c may be coupled to a mobility enabled router (MER) 50a-c, which can be tasked with providing offload functionalities for the architecture, as discussed herein. Note that the broad term 'offload' as used herein in this Specification is used to characterize any suitable change in routing, path management, traffic management, or any other adjustment that would affect packet propagation. This can further involve any type of re-routing, directing, managing, hop designation, adjustment, modification, or changes to a given routing path (at any appropriate time).

MERs 50a-c can be connected to an Ethernet backhaul 18 in certain non-limiting implementations. Communication system 10 can also include various network elements 22a-f, which can be used to exchange packets in a network environment. As illustrated in this example implementation, the architecture of communication system 10 can be logically broken into a cell site segment, a mobile telephone switching office (MTSO) segment, a regional sites segment, and a mobile data center (DC) segment. A default path 60 generally indicates the default routing path for traffic propagating in communication system 10.

A packet data network gateway/serving gateway (PGW/SGW) 20 may be connected to Ethernet backhaul 18 (and/or a data center) through one or more intermediate network elements. The mobile data center may include a Multimedia Messaging Service (MMS) 24 and an Internet protocol (IP) Multimedia Subsystem (IMS) 26. A Mobility Management Entity (MME) 28 is also provided in this example for facilitating user interaction, such as tracking user equipment, authenticating users, etc. Other networks, including an instantiation of an Internet 58, may be connected to the mobile wireless network at various suitable locations, including at various network elements and Ethernet backhaul 18.

Each of the elements of FIG. 1 may couple to one another through simple interfaces (as illustrated), or through any other suitable connection (wired or wireless), which can provide a viable pathway for network communications. Additionally, any one or more of these elements may be combined or removed from the architecture based on particular configuration needs. Communication system 10 may facilitate transmission control protocol/Internet protocol (TCP/IP) communications for the transmission or reception of packets in a network, and may operate in conjunction with a user datagram protocol/IP (UDP/IP), or any other suitable protocol where appropriate and based on particular needs.

Communication system 10 may be tied to the 3rd Generation Partnership Project (3GPP) Evolved Packet System architecture, but alternatively this depicted architecture may be equally applicable to other environments. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks can be performed via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that user equipment 12a-c can be associated with clients, customers, or end users wishing to initiate a communication in system 10 via some network. In one particular example, user equipment 12a-c reflects devices configured to generate wireless network traffic. The term 'endpoint' and 'end-station' are included within the broad term user equipment, as used herein. User equipment 12a-c can include devices used to initiate a communication, such as a computer, a personal digital assistant (PDA), a laptop or electronic notebook, a cellular telephone, an iPhone, a Blackberry, an Android, a smartphone, a tablet, an iPad, an IP phone, or any other device, component, element, equipment, or object capable of initiating voice, audio, video, media, or data exchanges within communication system 10. User equipment 12a-c may also include a suitable interface to the human user, such as a microphone, a display, or a keyboard or other terminal equipment. User equipment 12a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

For purposes of illustrating certain example techniques of communication system 10, it is important to understand the communications that may be traversing the network. The following foundational information may be viewed as a basis from which the present disclosure may be properly explained. IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets.

The term packet is used to refer to data plane packets, control plane packets, and management plane packets. In general, the data plane (also known as the forwarding plane, or the user plane) provides the ability to forward data packets; the control plane provides the ability to route data correctly; and the management plane provides the ability to manage network elements. For normal IP packet processing, an IP router typically has a data plane, a control plane, and a management plane. The IP packets themselves support all of the planes for any IP-based protocol, and the IP router has no inherent knowledge about whether each IP packet is a data, control, or management plane packet.

The vast majority of packets handled by a router travel through the router via the data plane. Data plane packets typically consist of end-station, user-generated packets, which are forwarded by network devices to other end-station devices. Data plane packets may have a transit destination IP address, and they can be handled by normal, destination IP address-based forwarding processes. Service plane packets can be a special type of data plane packets. Service plane packets are also user-generated packets, which may be forwarded by network elements to other end-station devices; however, they may require high-touch handling by a network element (above and beyond normal, destination IP address-based forwarding) to properly forward the packet.

Examples of high-touch handling include such functions as generic routing encapsulation (GRE), quality of service (QoS), virtual private networks (VPNs), and secure socket layer/IP security (SSL/IPsec) encryption/decryption. In a mobile network, the data plane may be responsible for packet processing at a session/flow level, multiple flows/session per active user, access control list (ACL)/traffic flow template (TFT) filters per user/flow, tunneling, rate limiting, subscriber scalability, security, and Layers 4-7 (L4-L7) inspection. These activities are typically intensive in terms of memory and packet processing.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on an IP router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station that are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP).

Typically, mobile wireless service providers have selected and deployed gateway products that combine mobile wireless specific control plane functionality (and protocol usage) with data plane functions. The data plane functions may be used for classification, tunneling, feature enforcement, and accounting. Such a combined functionality may be viable for subscriber traffic models exhibiting low-data throughput and, further, having an active device population that supports data services in the few million range. However, as the number of subscribers and data throughput increases, this strategy can limit the ability of service providers to scale their systems accordingly.

In typical cellular networks, mobile traffic is sent over the Radio Access Network to eNBs 14a-c (or a Node B (UMTS)). From there, mobile traffic is further processed by mobile packet network elements, (e.g., RNC/SGSN/gateway GPRS support node (GGSN) (UMTS) or MME/SGW/packet data network gateway (PGW) (LTE/EPC).) Throughout the cellular network, there are many more eNBs than mobile packet elements and, hence, cellular traffic should be backhauled from the cell site to the mobile packet core elements. There are different backhaul network technologies available; however, backhaul network technologies differ in terms of speeds, feeds, costs, and quality. RAN Backhaul (from the cell site) is relatively expensive but relatively cheaper connections from the cell site will often not come with the necessary Service Level Agreements (SLAs), etc.

Not all access technologies are available to every cell site, often more than one is available (having different quality and cost for each available backhaul network technology). In addition, synchronization signals for cellular network timing are often needed to cell sites. Synchronization is commonly present in legacy backhaul technologies (e.g., TDM) due to their synchronous nature. For newer non-synchronous backhaul network technologies, synchronization can be provided via different mechanisms on top of IP-based backhaul network technologies (however, some operators may not be comfortable with that situation). A basic problem with typical cellular networks is that mobile traffic is sent over "high quality" and expensive backhaul links. For example, voice traffic (high value per bit) needs a high-quality backhaul link, while best-effort Internet bound traffic (low value per bit) does not need a high quality backhaul link.

An approach is needed that allows for different types of traffic to be sent over different types of backhaul links with different characteristics (and associated costs). One option would be to deploy more intelligence in the cell site (e.g., by use of deep packet inspection (DPI)), where the cell site (router) could discover the types of traffic being sent through it, and use the corresponding appropriate backhaul link. For example, voice traffic (high-value per bit) could be sent over an expensive high quality backhaul link, while best-effort Internet bound traffic (low-value per bit) could be sent over a less expensive lower quality backhaul link. There are multiple problems with such an approach. For example, given the large number of cell sites, capex at the cell site is a significant concern, and a DPI-based solution is likely to increase overall cell site capex.

Similarly, opex issues argue against deploying DPI-based solutions in the cell site. From a technical point of view, it may be difficult for a DPI-based solution to actually determine which traffic should be sent on which backhaul link. Encryption and encapsulation of the traffic could complicate a DPI-based solution, which in turn could also increase capex and opex issues. Furthermore, a cell site router-based approach would address traffic in the upstream direction only. A solution is needed for the downstream direction as well, especially considering that downstream traffic volumes generally far exceed upstream traffic volumes.

In accordance with the teachings of the present disclosure, the architecture discussed herein can offer a method and apparatus for routing traffic to and from a mobile device without propagating though a default path (e.g., SGSN/SGW, GGSN/PGW, etc.). The routers in the network can be configured to perform mobile user-plane functions under the control of one or more GGSNs/PGWs (3G/4G). To accomplish this, some GGSNs/PGWs and routers in the mobile network can include additional functional enhancements. However, other deployed network nodes (RNCs, SGSNs/SGWs, Node Bs, eNode Bs, etc.) can be assumed to be standards-based and, hence, would require no enhancements in certain implementations of the present disclosure.

The functional enhancements added to the network elements (e.g., routers) and GGSNs/PGWs can be referred to as MER enhancements and MER control agent enhancements (MER-CA) (e.g., GGSN with 3G or the equivalent PGW control agent with 4G). MERs in the network can be controlled by one or more MER-CAs (e.g., GGSN/PGW) to intercept and process mobile subscriber's traffic before such traffic reaches the GGSNs/PGWs. For instance, specific subscriber's traffic could be diverted to the Internet, transported over specific routes with different QoS parameters, diverted to local content servers/caches, etc.

Consider an example in which a cell site has at least two paths available to it: a low-cost low-quality path (e.g., DSL), and a high-cost high-quality path (e.g., TDM, ATM, or a Carrier-Ethernet). Furthermore, consider that the cell site router is enhanced/provisioned to be a MER cell site router and the pre-aggregation and/or aggregation routers are enhanced to be MER pre-agg/agg routers, as disclosed herein. Similar, the mobile anchor gateway (e.g., GGSN/PGW), is enhanced to be a MER-CA. Based on MER-CA intelligence, the cell site router MER is instructed which upstream traffic to backhaul over which path/link (e.g., for an extra fee, Skype/Facetime traffic can be routed on a high-quality path, whereas other Internet-bound traffic can be routed on a low-quality path). Similarly, the pre-aggregation or aggregation MER that manages a particular backhaul link can be instructed which downstream traffic should be sent over which path/link. The level of routing granularity can be determined by MER-CA intelligence, for example, session-level (e.g., looking at inner IP address or collection of bearers/PDP contexts), bearer-level (EPS bearer, PDP context), flow or application-level, DSCP/QoS settings, etc.

Note that the flow or application-level approach may require additional processing resources in the MER-CA and, hence, may not be the most desirable. Traffic could be routed on a certain path that is mapped to a given bearer/PDP context, for ease of MER handling (i.e., both the MER and the MER-CA can analyze EPS bearers/PDP context). In addition, different levels of granularity are possible. The MER (whether residing in the cell site or pre-aggregation/aggregation) should be instructed on how to handle particular traffic.

Since mobile endpoints are constantly moving, and because IP networks use dynamic routing protocols, the cell site router and pre-agg/agg router serving a given flow of traffic may change. To do this, the cell site routers and pre-aggregation/aggregation routers can be configured as MERs in accordance with the teachings of the present disclosure. This allows the MERs to process MER messages, as defined in the overall MER scheme and as disclosed herein (e.g., discovery requests, which are discussed below). Once a user session has been established, and traffic for that session is a candidate for selective backhaul link routing, the MER-CA can identify the upstream and downstream MERs. The downstream MER discovery procedure can be used to accomplish this, whereby the MER-CA is configured to send an in-band "discover" message from the MER-CA toward the user equipment (UE). This message will be forwarded inside GTP-U through the downstream MER (pre-agg/agg router), as well as the upstream MER (cell site router), provided there is one cell site router per cell site (which is normally the case).

Both the downstream and upstream MER can identify themselves to the MER-CA, thereby establishing an out-of-band signaling association with the MER-CA. (Out-of-band signaling can include separate signaling channels established between MERs and associated MER-CAs.) The signaling association can be M:N, meaning that any MER-CA may control several MERs, and any MER may be controlled by several MER-CAs. In-band signaling can include sending control information in the same GTP-U channels used for sending subscriber's data (e.g., default path 60).

In-band messages embedded in GTP-U channels may be used to avoid the need for MERs to interpret existing mobile signaling protocols (RANAP/GTP-C with 3G, and GTP-C v2 with 4G). Further, in-band messages may enable the MER-CA to perform MER discovery such that the MER-CA can dynamically discover which routers in the network are capable of being a MER or, more importantly, to dynamically discover which MER (currently) is forwarding a specific subscriber's traffic to be controlled. In addition, in-band messages may enable the MER-CA to discover when a specific subscriber's traffic has moved from one MER to another MER (as in a handover scenario).

Also, in-band messages may enable MERs to perform tunnel endpoint identifier (TEID) discovery to dynamically discover upstream/downstream TEIDs pair for a specific subscriber's traffic, and to discover the mapping of two different upstream/downstream TEIDs pairs (i.e., those used between GGSN/SGSN, and the corresponding pair used between RNC/SGSN). In one particular embodiment, the TEID is a 32-bit field used to multiplex different connections in the same GTP tunnel. In-band messages may enable MERs to discover new TEIDs associated with the subscriber when existing TEIDs become dormant. In addition, in-band messages may allow the MER-CA to control the discovered MERs through the establishment of direct out-of-band channels, and through sending appropriate control messages through such out-of-band (OOB) channels (reliable/redundant and secure). In addition, in-band messages may enable the MER-CA and MERs to exchange configuration and other parameters without manual associations/configurations.

In-band messages are initiated/terminated on the MER-CA and MERs ((e.g., MERs are transparent to other mobile nodes in the network). In-band messages can be transported by existing mobile nodes without requiring additional enhancements (with the exception of a GGSN being enhanced to perform certain functions associated with a MER-CA). In a particular embodiment, in order to prevent in-band messages from being forwarded to unintended entities during various failure scenarios, the outer tunnel's differentiated services code point (DSCP) field of in-band packets is set such that other routers at the edge of the network may be configured to block these messages from passing to the end users; even in the case of MER double failure (i.e., both active and redundant MER fail).

The MER to be controlled can be discovered dynamically, along with the downstream/upstream tunnel TEID associated with a specific subscriber. This, in turn, allows the MER-CA to instruct the MER (via the out-of-band signaling channel) which downstream traffic should be sent over particular backhaul links. This can be performed in various ways, for example, the MER can inform the MER-CA about specific backhaul links available, and the MER-CA can then specify the backhaul links to use for particular types of traffic. In addition, the MER-CA can simply operate with predefined classes of traffic, and the MER may be configured to map those classes of traffic to suitable backhaul links available to it (e.g., "low quality Internet", "high quality TDM", best effort, class of service (CoS) distinctions, quality of service (QoS) levels, etc.).

The cell site router MER is configured to establish backhaul link selections for the upstream data. To do this, the cell site router MER is configured to perform upstream TEID discovery, as described below, with certain changes. Since end user traffic is not actually broken out, but rather just backhauled differently, there is no new IP address (and associated network address translation (NAT) bindings) being established. Note that this makes the overall scheme somewhat simpler than the general MER and TEID discovery procedure discussed herein because routing (backhaul) paths can be changed on the fly without affecting an established session.

Similar to the downstream MER, the MER-CA can inform the upstream MER which traffic should be sent on which upstream links. Again, this can be accomplished in different manners, as described above. In addition, it can be signaled as part of the in-band discovery message, or through the out-of-band signaling channel established with the MER-CA. Once the above signaling has been completed, downstream traffic for a particular session can then be sent over different paths by the pre-agg/agg MER router, in accordance with the instructions provided by the MER-CA. Similarly, upstream traffic can be sent over different upstream paths by the MER cell site router, in accordance with instructions from the MER-CA.

Once an endpoint becomes dormant, the GTP-U tunnel associated with the endpoint (e.g., end user 12a) may disappear, and subsequently be reestablished with a different TEID. Similarly, TEIDs may be reused after some time interval. Therefore, the MERs (upstream and downstream) may maintain an inactivity timer used to detect potentially stale TEIDs. The inactivity timer may be preset based on the time it would take for an endpoint (and thus a GTP-U tunnel) to be deemed dormant. In addition, the MERs may check for TEIDs being assigned to another endpoint prior to expiration of the inactivity timer. If the inactivity timer has expired, or if a TEID has been assigned to another endpoint, then the discovery procedure can be triggered again to determine the new TEID.

The upstream MER (cell site router) will often change on a handover, due to mobility. When that happens, the downstream TEID can change as well. The downstream MER (pre-agg/agg router) may or may not change on handover. However if it does, the new router would not know of any special backhaul link selection for the downstream TEID. If the MER-CA is aware of the handover, it can simply perform the discovery procedures as described above.

However, in many cases, the MER-CA will not know that a handover has been completed (e.g., because the RNC, SGSN or SGW did not change as well). [It should be noted that when such a case is undetected, it does not interfere with normal system operation; rather, there is just not any backhaul link selection in place for the traffic (e.g., default routing is used instead).] The other mobile packet core elements (RNC, SGSN, SGW) may be enhanced with the MER functionality, whereby they either inform the MER-CA, or trigger a "stale" TEID and a "discovery" TEID procedure when handovers happen (and/or endpoints go dormant).

In addition, the MER-CA may perform periodic discovery for the targeted GTP-U tunnels. Periodic discovery may work reasonably well for users that experience occasional handovers during an active session. Further, the MERs may be configured with a targeted set of IP addresses, which are candidates for selective backhaul routing. The MER can then look inside the GTP-U tunnels, and when the MER identifies a targeted inner IP address for which the GTP-U tunnel is currently not setup for backhaul link selection, the discovery procedure is initiated with the MER-CA to determine whether this particular GTP-U tunnel should be routed differently over the backhaul network.

Routing changes may also lead to traffic going through a different downstream MER router than was previously being used. To protect against this, the MER-CA can periodically initiate the downstream discovery procedure. Similarly, routing updates received by the MER may enable the MER to determine that one or more sessions no longer pass through the MER and, as a result, pass information about those sessions to the MER-CA, which can trigger a new discovery procedure.

By applying the MER principles to backhaul link selection, different types of traffic can be sent on different types of backhaul links according to the cost and quality tradeoffs that are appropriate for particular types of traffic. MER-CA is enhanced to discover different MER routers for the upstream and downstream direction, and the optimizations performed by the MER are that of link selection, rather than local anchoring and breakout. This allows operators to use lower cost backhaul links for traffic that can tolerate the low quality of the backhaul link, without degrading quality or service for traffic, which cannot tolerate the low quality of the backhaul link, or for traffic targeted by the operator for offering the high quality backhaul link. The protocol can be deployed in a manner that does not require extensive provisioning or static configuration of the network infrastructure, but, rather, relies on central subscriber and traffic processing intelligence in the MER-CA (e.g., GGSN/PGW) coupled with dynamic signaling with the network infrastructure. Similarly, the protocol does not require DPI processing capabilities in the network infrastructure, and instead defines mechanisms that can be implemented on router platforms themselves.

Hence, the architecture of FIG. 1 can effectively reduce and eliminate the constraints of previous architectures by intelligently sending different types of traffic on different types of backhaul links according to cost and quality tradeoffs. Moreover, this data plane generalization further allows more user data to be offloaded at network elements much closer to the network edge. In one sense, the functions disclosed herein can be distributed across the network in order to alleviate processing that would otherwise occur at a single network element. This would directly reduce the downstream processing requirements (e.g., at PGW/SGW 20).

Turning to FIG. 2A, FIG. 2A is a simplified block diagram illustrating one possible set of details associated with communication system 10. FIG. 2A includes handset 12a and MER 50a. FIG. 2A further includes cell sites 30a-c, a radio network controller (RNC) 32, a serving general packet radio service (GPRS) support node/serving gateway (SGSN/S-GW) 34, routers 52, and GGSN/PGW 54. In a particular embodiment, GGSN/PGW 54 is a MER-CA, which includes the control agent functions being discussed herein.

In general terms, cell sites 30a-c are a site where antennas and electronic communications equipment are used (e.g., provisioned on a radio mast or tower) to create a cell in communication system 10. Routers 52 may be enhanced and converted to MERs. (MER 50a and MER 50b are an enhanced version of a router 52 deployed in communication system 10.) The elements shown in FIG. 2A may couple to one another through simple interfaces (as illustrated) or through any other suitable connection (wired or wireless), which provides a viable pathway for network communications. Additionally, any one or more of these elements may be combined or removed from the architecture based on particular configuration needs.

In a particular embodiment, handset 12a communicates data to one or more cell sites 30a-c. From cell sites 30a-c, the data propagates to either RNC 32, which communicates the data to MER 50a, or directly to MER 50a. The data is communicated from MER 50a to a core network 56 (e.g., an IP or a multiprotocol label switching (MPLS) network) through SGSN/SGW 34, routers 52 and 52b, and GGSN/PGW 54 on default path 60. Operationally, MER 50a may be configured to breakout the data (or a packet of data) and communicate the data to a destination that is not on default path 60. For example, MER 50a may communicate the data to Internet 58 using a breakout path 106.

Note that data may travel on default path 60 in various manners. For example, in a particular embodiment, communication system 10 may include a GPRS core network. The GPRS core network transmits IP packets to external networks such as core network 56 and, further, provides mobility management, session management, and transport for Internet Protocol packet services in GSM and WCDMA networks. The GPRS core network may also provide support for other additional functions such as billing and lawful interception. The GPRS core network may use tunneling to allow UE 12a to be moved from place to place, while continuing to be connected to communication system 10. In a particular embodiment, the tunneling is created using a GPRS tunneling protocol. The protocol allows end users (or users of UE 12a) to move, while continuing to connect as if from one location (e.g., at GGSN/PGW 54) by carrying the end user's data from the SGSN to the GGSN/PGW tasked with handling the subscriber's session.

Typically, when data from UE 12a is initially communicated to communication system 10, a first upstream tunnel and second downstream tunnel are created from RNC 32, through MER 50a, to SGSN 34. In addition, a second upstream tunnel and a first downstream tunnel are created from SGSN 34 to GGSN 54. Each tunnel can have a unique TEID/source IP address.

RNC 32 may be configured as a governing element in a universal mobile telecommunications system (UMTS) (one of the third-generation (3G) mobile telecommunications technologies, also being developed into a 4G technology) or in a radio access network universal terrestrial radio access network (UTRAN), and can be responsible for controlling any node B (e.g., eNBs 14a-c that are connected to RNC 32). [Note that node B (eNB 14a-c) is a term used in UMTS, and is generally equivalent to the base transceiver station (BTS) description used in GSM, and, further, reflects the hardware that is connected to the mobile phone network that communicates directly with mobile handsets.]

RNC 32 can carry out radio resource management, mobility management functions, and may be the point where encryption (if any) is performed before data is sent to (and from) UE 12a. RNC 32 communicates the data to MER 50a. MER 50a may route some or all of the data to SGSN/SGW 34 along default path 60 and, further, may route some or all of the data to a destination other than SGSN/SGW 34 on breakout path 106. [Note that this includes using breakout path 106 to allow MER 50a to directly communicate with GGSN/PGW (e.g., using a GRE tunnel) as is described below.] In a particular embodiment, there is more than one breakout path 106 and the number of breakout paths 106 may depend on the networks or elements in communication with MER 50a.

SGSN/SGW 34 is configured for the delivery of data to (and from) mobile stations within its geographical service area. SGSN/SGW 34 tasks may include packet routing and transfer, logical link management, and authentication and charging functions. In a particular embodiment, SGSN/SGW 34 stores location information (e.g., current cell, current VLR) and user profiles (e.g., international mobile subscriber identity (IMSI), address(es) used in the packet data network) of GPRS users that are registered with the SGSN/SGW 34. SGSN/SGW 34 may also be configured to de-tunnel GTP packets from GGSN/PGW 54 for downstream traffic, tunnel IP packets toward GGSN/PGW 54 for upstream traffic, and perform mobility management (e.g., in standby mode) as a mobile moves from one routing area to another routing area.

GGSN/PGW 54 may be a component of a GPRS network and reflects the anchor point, which affords mobility to UE 12a in communication system 10 (e.g., the GPRS/UMTS networks.) GGSN/PGW 54 maintains the routing used to tunnel protocol data units (PDUs) to the SGSN/PGW (e.g., SGSN/SGW 34), which services UE 12a. GGSN/PGW 54 is the tunnel endpoint for a GGSN/PGW specific GTP-tunnel. GGSN/PGW 54 can be (indirectly) selected by the end user at setup of a packet data protocol (PDP) context. From an addressing perspective, GGSN/PGW 54 represents the point of presence for 'logged on' end users (i.e., end users with an established PDP-context). Addresses can be dynamically assigned (fetched from an external server or a pool of owned addresses) or statically assigned. GGSN/PGW 54 may be configured to perform functions such as tunnel management, IP address management, charging data collection/output, security management, packet filtering, packet routing/tunneling, QoS management, and element management (particularly MER 50a management).

GGSN/PGW 54 may be configured for the interworking between elements of communication system 10 and external packet switched networks (e.g., like core network 56). From a network external to communication system 10, GGSN/PGW 54 can appear as a router to a sub-network, because GGSN/PGW 54 may "hide" the infrastructure of communication system 10 from the external network. In a particular embodiment, GGSN/PGW 54 can determine if a specific user (UE 12a) is active when GGSN/PGW 54 receives data addressed to the specific user. If the specific user is active, GGSN/PGW 54 can forward the received data to SGSN/SGW 34 serving the specific user. However, if the specific user is inactive, then the data may be discarded. In a particular embodiment, mobile-originated packets are routed to the correct network by GGSN/PGW 54.

GGSN/PGW 54 can convert the GPRS packets (propagating from SGSN/SGW 34) into the appropriate packet data protocol (PDP) format (e.g., IP or X.25), and then communicate the packets on a corresponding packet data network. In the other direction, PDP addresses of incoming data packets can be mapped to a particular GTP tunnel and then sent on that GTP tunnel (towards SGSN/SGW 34, or, if a direct tunnel is used in 3G, the data packets may be sent to RNC 32. The readdressed packets are sent to the responsible SGSN/SGW 34. For this purpose, GGSN/PGW 54 may store the current SGSN/SGW 34 address and profile of the user in a location register. GGSN/PGW 54 can be responsible for IP address assignment and may be the default router for the connected specific user (UE 12a). GGSN/PGW 54 may also perform authentication and billing/charging functions. Other functions include subscriber screening, IP Pool management and address mapping, QoS, and PDP context enforcement.

An out-of-band channel 73 can be used by GGSN/PGW 54 and MER 50a to communicate data without having to send the data on default path 60. By not using default path 60, the data may be on a path with different attributes (e.g., a more reliable and redundant path or a less expensive, lower quality path, etc.) than default path 60. In addition, the data being communicated between GGSN/PGW 54 and MER 50a does not add to the traffic already on default path 60. Using out-of-band channel 73, GGSN/PGW 54 can control MER 50a and can communicate offload instructions and other information (such as configuration parameters) to MER 50a.

Figure 2B:
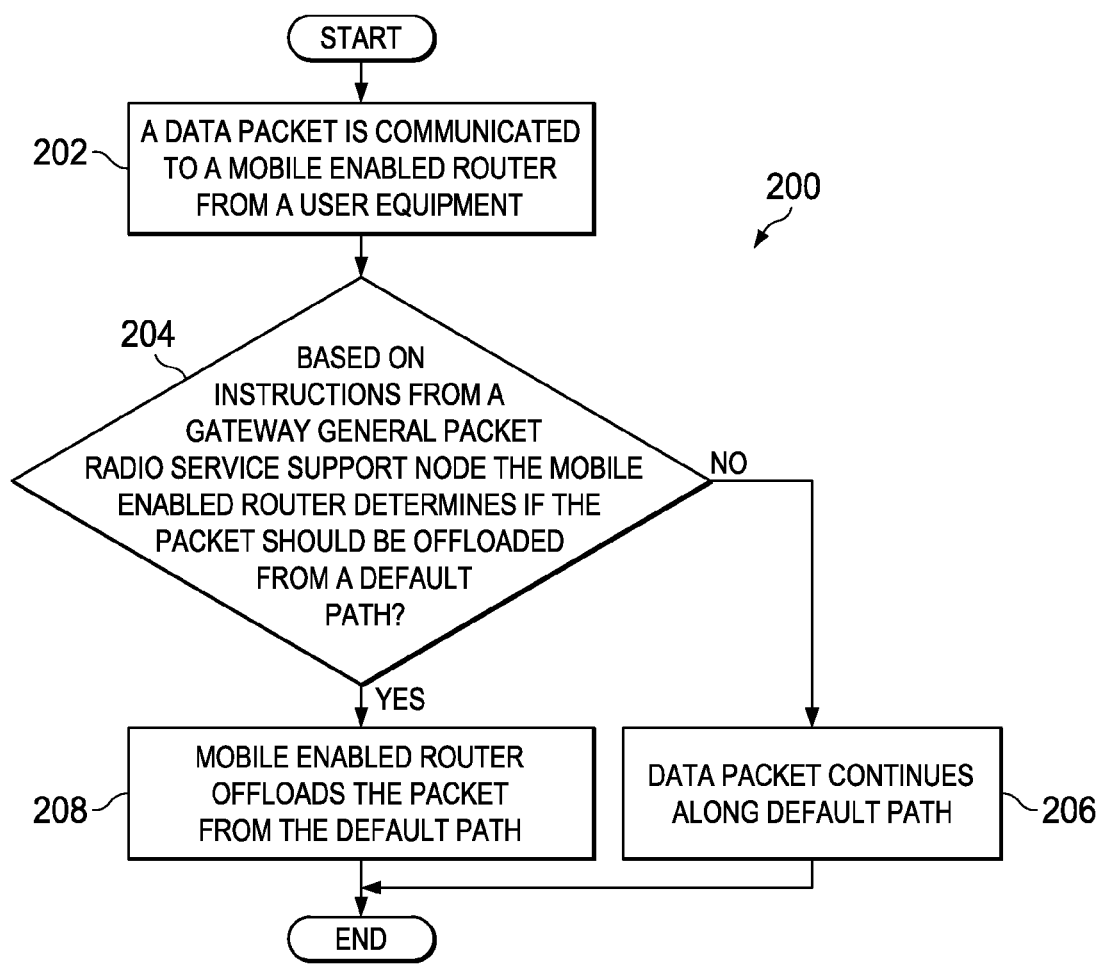
FIG. 2B is a simplified flow diagram illustrating potential operations associated with one embodiment of the present disclosure.

Turning to FIG. 2B, FIG. 2B is a simplified flowchart 200 illustrating one potential operation associated with the present disclosure. In 202, a data packet is communicated to a MER from a UE. For example, UE 12a may communicate a data packet to MER 50a. In 204, based on instructions from a GGSN/PGW, the MER determines if the data packet should be offloaded from a default path. If the MER determines that the data packet should not be offloaded, then the data packet can continue along a default path, as illustrated in 206. For example, the data packet may continue along default path 60. If the MER determines that the data packet should be off-loaded, then the data packet can be offloaded from the default path, as illustrated in 208. For example, MER 50 may offload the data packet from default path 60 using breakout path 106 and, subsequently, communicate the data packet to Internet 58.

Figure 3A:
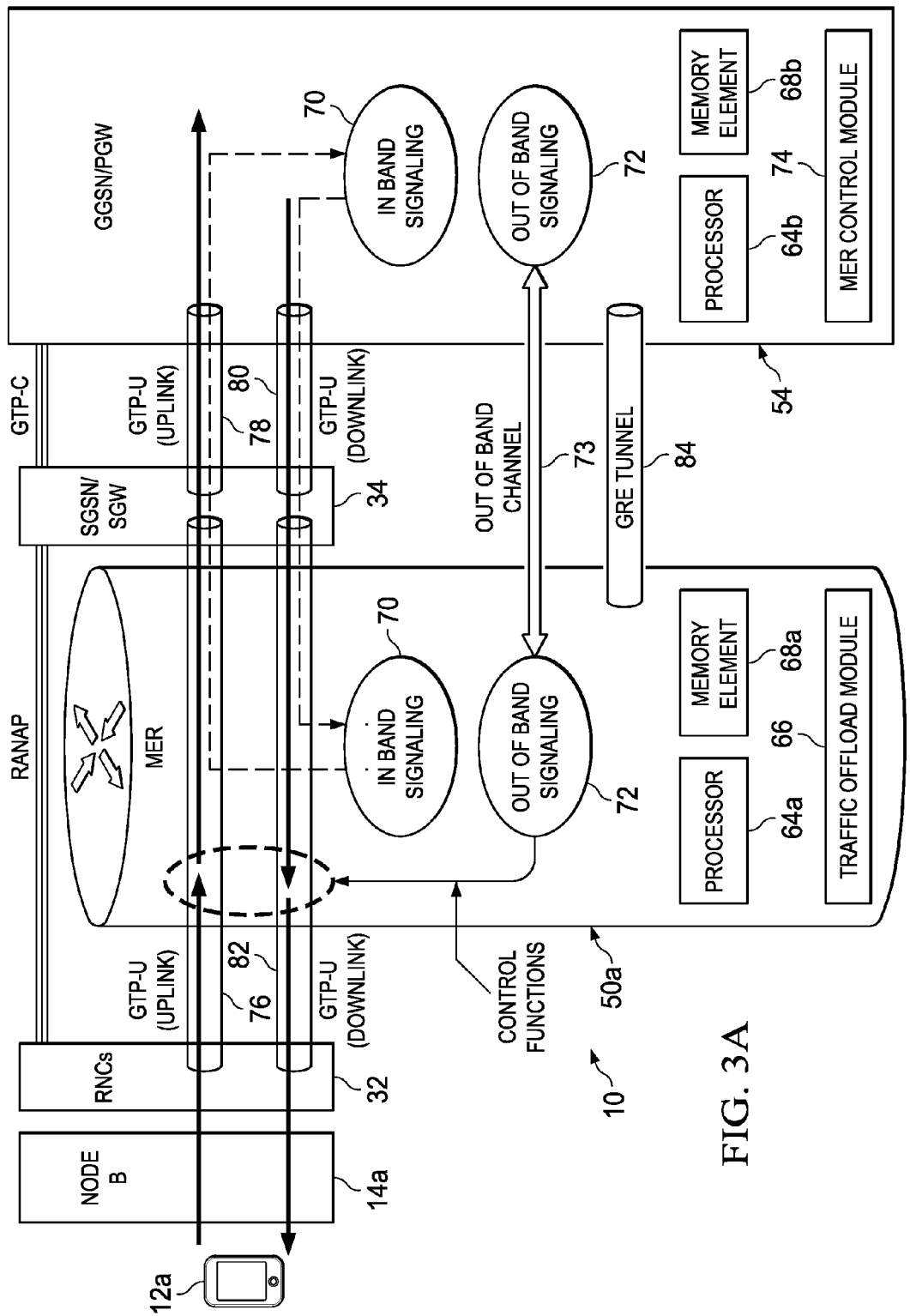
FIG. 3A is a simplified block diagram illustrating possible example details associated with one embodiment of the present disclosure.

Turning to FIG. 3A, FIG. 3A is a simplified block diagram illustrating one possible set of details associated with communication system 10. FIG. 3A includes handset 12a, (e)NB 14a, RNC 32, MER 50a, SGSN/SGW 34, and GGSN/PGW 54. MER 50a includes a respective processor 64a, a traffic offload module 66, and a respective memory element 68a. GGSN/PGW 54 includes a respective processor 64b, a MER control module 74, and a respective memory element 68b. A first upstream tunnel 76 connects RNC 32 to SGSN/SGW 34 through MER 50. A second upstream tunnel 78 connects SGSN/SGW 34 to GGSN/PGW 54. Second upstream tunnel 78 may propagate through a router (e.g., router 52 shown in FIG. 2A) or a MER similar to MER 50a but located further upstream (for example, if router 52 was configured to be MER 50b).

In a particular embodiment, MER 50a is located at the borders between networks/network segments. While MER 50a may be almost any enhanced network element in communication system 10, the closer that MER 50a is to UE 12a, the earlier MER 50a can offload traffic from default path 60. A first downstream tunnel 80 can connect GGSN/PGW 54 to SGSN/SGW 34. A second downstream tunnel 82 can connect SGSN/SGW 34 to RNC 32 through MER 50a. Second upstream tunnel 78 and first downstream tunnel 80 may couple through a router (e.g., router 52 shown in FIG. 2A) or a MER similar to MER 50b shown in FIG. 2A.

GGSN/PGW 54 can use MER control module 74 to control MER 50a and enable MER 50a to perform user-plane functions for both packet and circuit mode communication, particularly offloading traffic from the core network (e.g., default path 60). MER 50a uses traffic offload module to perform the user-plane functions and, further, offload traffic as instructed by GGSN/PGW 54. MER 50a may also be configured to handle media processing (e.g., speech coding. conference call bridging etc), media generation of tones etc., setup and release of user data bearers, provision of traffic/charging info for packet mode communication, security management, routing and switching QoS management, and element management.

Out-of-band channel 73 is a separate signaling channel established between MER 50a and GGSN/PGW 54. Out-of-band signaling 72 references communication between MER 50a and GGSN/PGW 54 that does not occur over default path 60. In-band signaling 70 references communication between MER 50a and GGSN/PGW 54 (and other elements) using default path 60. In a particular embodiment, the out-of-band signaling 72 association is M:N meaning that any GGSN/PGW 54 may control several MERs, and any MER may be controlled by several GGSNs/PGWs 54. Out-of-band channel 73 is used to establish a GRE tunnel 84 between MER 50a and GGSN/PGW 54. GRE tunnel 84 is used to loopback traffic to MER 50a during handovers and discovery procedures and, further, may be used to communicate data to GGSN/PGW 54 that cannot be processed or serviced by MER 50a. Buffering of user traffic during these procedures can be performed on either GGSN/PGW 54 or MER 50a or both (implementation dependent).

First upstream tunnel 76, second upstream tunnel 78, first downstream tunnel 80, and second downstream tunnel 82 can be part of default path 60. In addition first upstream tunnel 76, second upstream tunnel 78, first downstream tunnel 80, and second downstream tunnel 82 may be GTP-U tunnels and each may have a unique TEID/source IP address. Initially, MER 50a does not know the TEID for first upstream tunnel 76, second upstream tunnel 78, first downstream tunnel 80, and second downstream tunnel 82 and, therefore, cannot control UE 12a's traffic without knowing the TEIDs for first upstream tunnel 76 and second downstream tunnel 82. Using out-of-band channel 73 and TEID discovery procedure, GGSN/PGW 54 communicates the TEID for first upstream tunnel 76 and second downstream tunnel 82 such that MER 50a knows which UE's traffic is to be controlled and how the UE's traffic should be controlled (e.g., if any traffic from UE 12a should be offloaded).

GGSN/PGW 54 does not actually know the TEIDs (unless a direct tunnel has been created). Hence, GGSN/PGW 54 relies on MER 50a to perform TEID discovery and communicate the TEIDs to GGSN/PGW 54 (this may be indirectly through a GTP-U tunneled path). GGSN/PGW 54 in turn, sends a packet back towards MER 50a thereby enabling download TEID discovery, as well as determining if the upstream TEID (GTP-U tunnel) really was to be off-loaded in the first place (e.g. overlapping IP-addresses could cause a false trigger in the MER). Once TEID discovery is done, GGSN/PGW 54 and MER 50a can communicate directly (e.g. through GRE tunnel 84) and exchange information about what traffic needs to be off-loaded based on the TEID information exchanged.

Once MER 50a knows the TEID of first upstream tunnel 76 and second downstream tunnel 82, traffic can be offloaded from default path 60, and when the traffic for UE 12a is returned, MER 50a can communicate the data in the returned traffic to UE 12a. In a particular embodiment, if data is returned to MER 50a and the returned data needs to propagate through GGSN/PGW 54, then MER 50a can communicate that data to GGSN/PGW 54 using GRE tunnel 84. GGSN/PGW 54 may similarly return the data to MER 50a using GRE tunnel 84 or using first downstream tunnel 80.

Figure 3B:
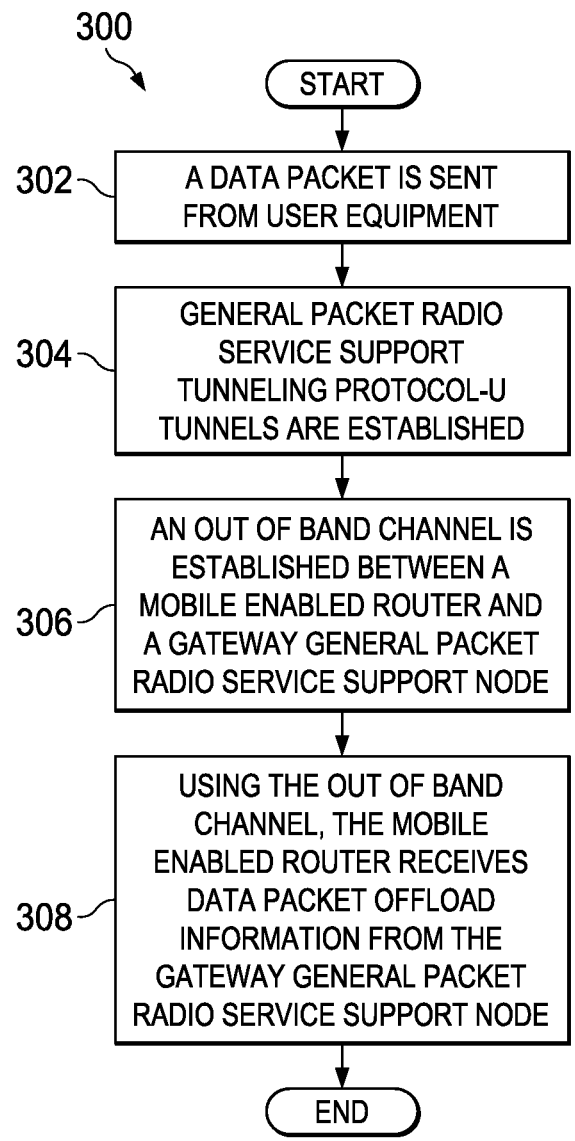
FIG. 3B is another simplified flow diagram illustrating potential operations associated with one embodiment of the present disclosure.

Turning to FIG. 3B, FIG. 3B is a simplified flowchart 300 illustrating one potential operation associated with the present disclosure. In 302, a data packet can be sent from user equipment requesting a connection to the mobile network.

For example, a data packet may be sent from UE 12a to RNC 32. In 304, GTP-U tunnels are established. For example, first upstream tunnel 76, second upstream tunnel 78, first downstream tunnel 80, and second downstream tunnel 82 may be established. In 306, an out-of-band channel is established between a MER and a GGSN. For example, out-of-band channel 73 may be established between MER 50a and GGSN/PGW 54. In 308, using the out-of-band channel, the MER can receive data packet offload information from the GGSN. For example, GGSN/PGW 54 may communicate data packet offload information (including TEIDs) to MER 50a using out of channel band 73.

MER Discovery and Path Selection

Turning to FIG. 4A, FIG. 4A is a simplified block diagram of communication system 10, which (in this particular implementation) may include UE 12a, cell site 30a-d, RNCs 32a-g, MER 50a-c, SGSN/SGW 34a-c, and GGSN/PGW 54a-c. When UE 12a attaches to the mobile network and requests connection through control plane messages, several GTP-U (user plane) tunnels may be established, (for example, first upstream tunnel 76, second upstream tunnel 78, first downstream tunnel 80, and second downstream tunnel 82 may be established on default path 60). The user plane data packet may propagate through one of cell sites 30a-d (e.g., cell site 30d) and through one of RNC 32a-g (e.g., RNC 32e). The data packet can travel through first upstream tunnel 76 to MER 50b. In a particular embodiment, at MER 50b, a MER identifier is added to a new data packet (in-band message) using the same tunnel identifier as the received user data and the new data packet is communicated to SGSN/SGW 34b and on to GGSN/PGW 54a via second upstream tunnel 78. The MER identifier may be an identifier that identifies MER 50b and informs GGSN/PGW 54a that MER 50b is not just a router, but has been enhanced and configured to behave as a MER.

GGSN/PGW 54a sends a MER discovery message (which can be triggered by the first upstream packet arriving at GGSN/PGW 54a or immediately after first upstream tunnel 76, second upstream tunnel 78, first downstream tunnel 80, and second downstream tunnel 82 are established) to SGSN/SGW 34b via first downstream tunnel 80. The MER discovery message travels from SGSN/SGW 34b to MER 50b via second downstream tunnel 82. Typically, the message would pass through MER 50b and onto RNC 32e; however, MER 50b intercepts the MER discovery message and establishes out-of-band channel 73 with GGSN/PGW 54a. By establishing out-of-band channel 73 between MER 50b and GGSN/PGW 54a, GGSN/PGW 54a can control MER 50b and, further, can communicate offload instructions and other information (such as configuration parameters) for MER 50b.

While it is possible to manually configure static associations of each MER with RNCs/SGSNs, such a paradigm can be error-prone, lack flexibility, present management issues, and failed to work in many deployment scenarios. In a particular embodiment, each GGSN/PGW 54a in communication system 10 may be configured to discover which MER in the network is currently forwarding the traffic from/to a specific UE (e.g., UE 12a), send session control instructions to the discovered MER related to the required treatment of the specific UE's traffic, discover when the specific UE moves from one MER to another (e.g., in a handover scenario), and send control information to the new MER.

In one particular embodiment, a MER identifier is not added to the data packet by MER 50b. Usage of in-band signaling (not shown) can allow GGSN/PGW 54a to embed discovery messages in the GTP-U tunnels that were already established for a specific UE. For example, after GGSN/PGW 54a first receives the data from UE 12a, GGSN/PGW 54a can send the discovery message to MER 50b using first downstream tunnel 80 and second downstream tunnel 82.

Because the discovery message can follow the same path as UE's 12a traffic, if a MER is present in the path, the MER can always be discovered without prior configurations. No special procedures would be required on other network nodes to pass through such traffic. Interception and interpretation of the embedded messages within these discovery messages can be performed at the MER. Note that such messages are not forwarded to end users (end points) in particular implementations of the present disclosure. Because of the establishment of direct/secure signaling channels between MERs and because control of GGSN/PGWs occurs without prior configurations, the MER discovery procedure is dynamic in nature, does not require manual associations, and operates in a multitude of deployment scenarios.

Dynamic discovery of MER 50b is enabled by passing IP addresses/ports and protocols, supported by GGSN/PGW 54a within the in-band discovery message. Further, when UE's 12a traffic moves from one MER to another MER (e.g., traffic is moved from MER 50b to MER 50a), the new MER (MER 50a) initially forwards such traffic to GGSN/PGW 54a since it does not yet have instructions from GGSN/PGW 54a regarding UE's 12a traffic. Upon receiving the traffic from the new MER (MER 50a), the GGSN/PGW 54a is triggered to initiate another MER discovery procedure in which GGSN/PGW 54a discovers the new MER (MER 50a) and instructs the new MER to perform the appropriate handling. During the MER discovery procedure, UE's 12a traffic in the upstream direction, if any, can be buffered at either the new MER or GGSN/PGW 54a or both (i.e., it can be implementation dependent). The MER discovery procedure can be used in both direct tunnel (DT) and non-DT cases.

Figure 4B:
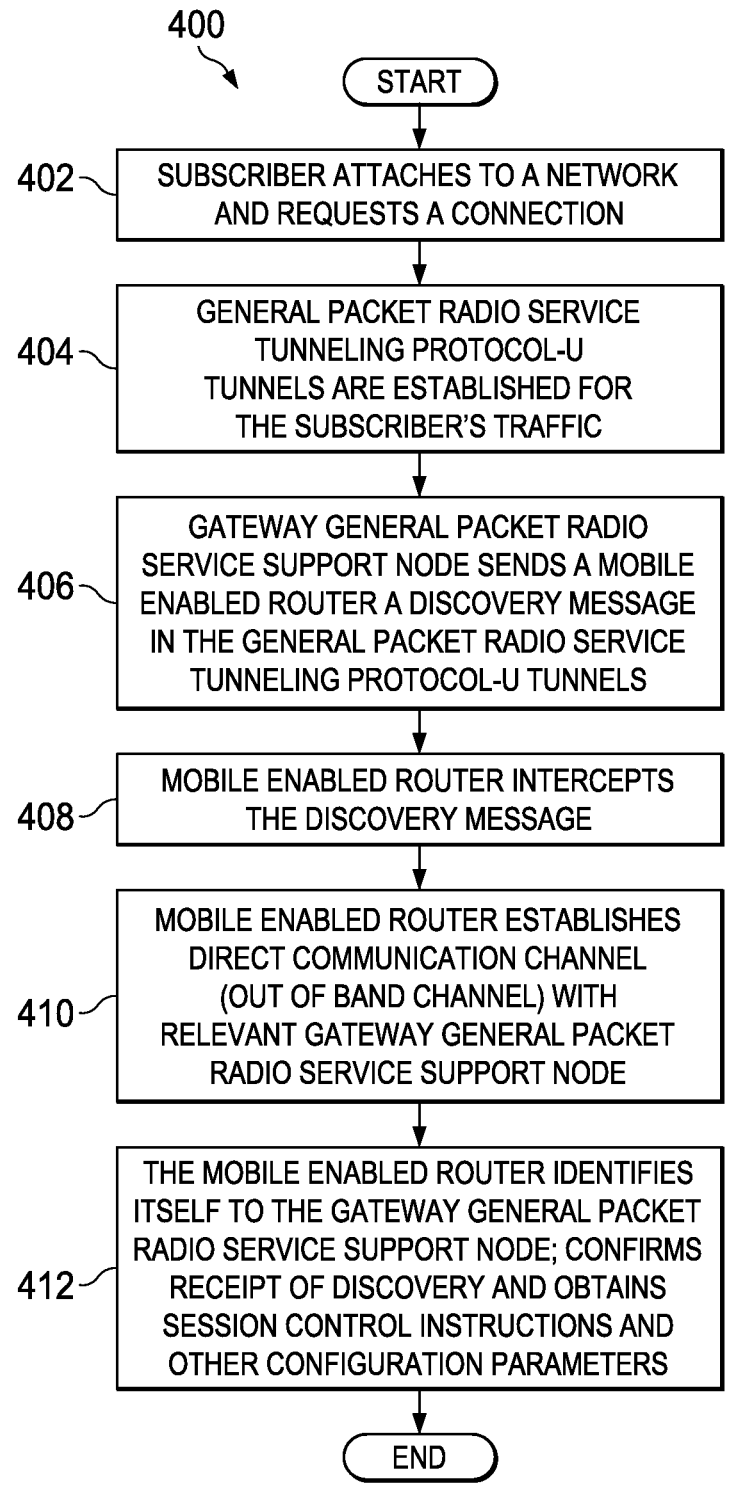
FIG. 4B is another simplified flow diagram illustrating potential operations associated with one embodiment of the present disclosure.

Turning to FIG. 4B, FIG. 4B is a simplified flowchart 400 illustrating one potential operation associated with the present disclosure. In 402, a subscriber attaches to a network and requests a connection. For example, a subscriber may use UE 12a to attach to communication system 10 and request a connection with cell site 30d. In 404, GPRS-U tunnels are established for the subscriber's traffic. For example, first upstream tunnel 76, second upstream tunnel 78, first downstream tunnel 80, and second downstream tunnel 82 may be established on default path 60 for UE's 12a traffic. In 406, GGSN sends (to a MER) a discovery message via the GPRS tunnels. For example, GGSN/PGW 54a may send MER 50b a discovery message using first downstream tunnel 80, and second downstream tunnel 82.

In 408, the mobile enabled router intercepts the discovery message. For example, MER 50b may intercept the MER discovery message sent from GGSN/PGW 54a. In 410, the MER can establish a direct communication channel (out-of-band channel) with the GGSN. For example, MER 50b may establish out-of-band channel 73 with GGSN/PGW 54a. In 412, the MER identifies itself to the GGSN, confirms receipt of the discovery request, and obtains session control instructions and other configuration parameters. For example, using out-of-band channel 73, MER 50b may be configured to identify itself to GGSN/PGW 54a, confirm receipt of the discovery request, and obtain session control instructions and other configuration parameters from GGSN/PGW 54a.

TEID Discovery

Turning to FIG. 5A, FIG. 5A is a simplified block diagram of communication system 10, which (in this particular implementation) may include UE 12a, cell sites 30a-d, RNCs 32a-g, MER 50a-c, SGSN/SGW 34a-c, and GGSN/PGW 54a-c.

In most deployment scenarios, multiple GTP-U tunnels can be established for the same subscriber's traffic. For example, first upstream tunnel 76 (UL-TEID-1) and second downstream tunnel 82 (DL-TEID-2) can be established between SGSN/SGW 34b and RNC 32e, and second upstream tunnel 78 (UL-TEID-3) and first downstream tunnel 80 (DL-TEID-4) can be established between SGSN/SGW 34b and GGSN/PGW 54a.

GGSN/PGW 54a can identify the TEID for second upstream tunnel 78 (UL-TEID-3) and first downstream tunnel 80 (DL-TEID-4). Depending on the scenario, MER 50b may know only the TEID for first upstream tunnel 76 (UL-TEID-1) and second downstream tunnel 82 (DL-TEID-2), or MER 50b may not know any TEIDs. Thus, if GGSN/PGW 54a attempts to instruct MER 50b about the treatment of UE's 12a traffic, there is no simple common reference. Furthermore, the inner IP address assigned to UE 12a is not unique either (i.e., it cannot be used as a common reference), because overlapping IP address support is commonly required. Hence, a TEID discovery procedure needs to be employed to discover the TEID of first upstream tunnel 76 (UL-TEID-1), second downstream tunnel 82 (DL-TEID-2), second upstream tunnel 78 (UL-TEID-3), and first downstream tunnel 80 (DL-TEID-4) and the bindings of these tunnels to UE 12a.

In a particular embodiment, when a data packet is first sent from UE 12a through communication system 10, first upstream tunnel 76, second upstream tunnel 78, first downstream tunnel 80, and second downstream tunnel 82 may be established (e.g., on default path 60). The data packet can be communicated to cell site 30d and to RNC 32e. Using first upstream tunnel 76, from RNC 32e, the packet can be communicated to SGSN/SGW 34b, through MER 50b. Using second upstream tunnel 78, from SGSN/SGW 34b, the data packet can also be communicated to GGSN/PGW 54a.

GGSN/PGW 54a can receive the data packet and, in response, communicate a MER discovery message to SGSN/SGW 34b using first downstream tunnel 80. Using the second download link tunnel 82, SGSN/SGW 34b communicates the MER discovery message to MER 50b. Typically, the message would pass through MER 50b and onto RNC 32e; however, MER 50b can intercept the MER discovery message and establish out-of-band channel 73 with GGSN/PGW 54a, if one does not yet exist. By establishing out-of-band channel 73 between MER 50b and GGSN/PGW 54a, GGSN/PGW 54a can control MER 50b and, further, communicate offload instructions and other information (such as configuration parameters) to MER 50b.

In order to be able to control the traffic of a specific UE (e.g., UE 12a), each GGSN/PGW 54a in communication system 10 can be configured to discover which MER in the network is currently forwarding the traffic from/to that UE (e.g., because GGSN/PGW 54a received traffic from UE 12a, and GGSN/PGW 54a has the intelligence to discover the particular MER that is handling the traffic for UE 12a). In addition, each GGSN/PGW 54a in communication system 10 can be configured to send session control instructions to the discovered MER related to the required treatment of the UE's traffic and, further, discover when the UE moves from one MER to another (as in a handover scenario) and subsequently send control information to the new MER.

In a particular embodiment, MER 50b sends an in-band message (GTP-U packet) in first upstream tunnel 76 in an attempt to discover the associated TEIDs of first upstream tunnel 76 (TEIDs-1-4 bindings in this example). Within the in-band message, UL-TEID-1 is embedded in the payload and the type of message is set to loopback. When the in-band message arrives at SGSN/SGW 34b, SGSN/SGW 34b can treat the packet as any other user packet and change the TEID to match the TEID of the second upstream tunnel 78 (TEID-3, in this example), and pass the packet to the appropriate GGSN/PGW 54a. (Note that the contents of the embedded payload are not necessarily modified by SGSN/SGW 34b, just the outer tunnel could be modified.)

When the in-band message arrives at GGSN/PGW 54a, GGSN/PGW 54a can intercept (i.e., receive) the in-band message and form the requested loopback function based on the embedded message type. If the MER did not include such information in the message, as is applicable to certain deployment cases, GGSN/PGW 54a may add TEID-3/4 mapping to the payload of an in-band loopback packet (the loopback response to the in-band message) before performing the loopback. GGSN/PGW 54a can communicate the in-band loopback packet to SGSN/SGW 34b on first downstream tunnel 80. Using second downstream tunnel 82, SGSN/SGW 34b can communicate the in-band loopback packet to RNC 32e.

When the in-band loopback packet arrives at MER 50b, on the way to RNC 32e, MER 50b intercepts and interprets the embedded message, which may include the TEIDs bindings (as well as other parameters, such as the assigned IP address to UE 12a and GGSN/PGW 54a). At this juncture, MER 50b understands which UE's 12a traffic is to be controlled and is ready to implement whatever policies the GGSN/PGW 54a may dictate related to traffic from UE 12a. In one particular embodiment, MER 50b may also establish out-of-band channel 73 with GGSN/PGW 54a.

Figure 5B:
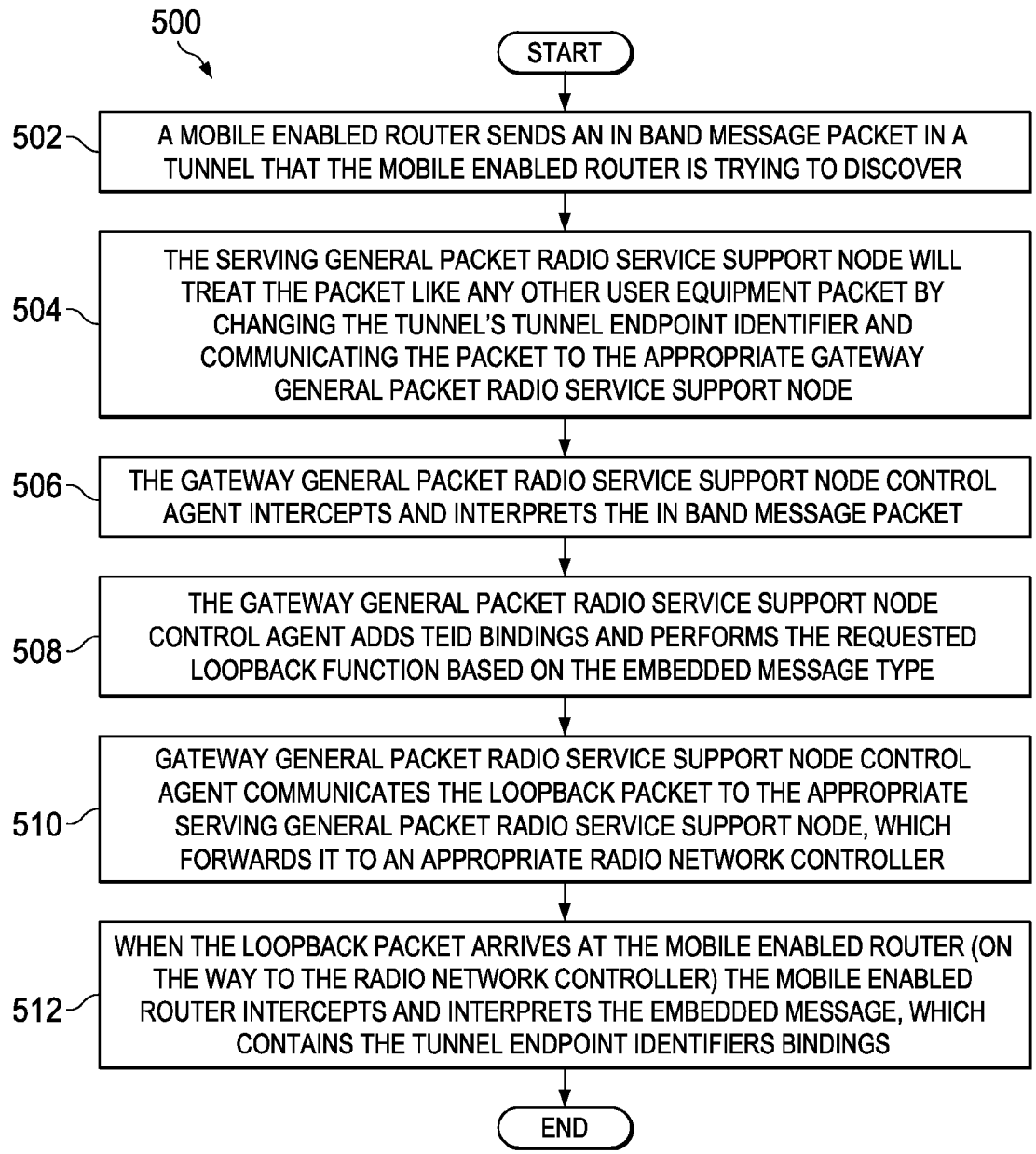
FIG. 5B is another simplified flow diagram illustrating potential operations associated with one embodiment of the present disclosure.

Turning to FIG. 5B, FIG. 5B is a simplified flowchart 500 illustrating one potential operation associated with the present disclosure. In 502, a MER sends an in-band message packet in a tunnel that the MER is attempting to discover. In a particular embodiment, a TEID can be embedded in the payload of the packet, where the message is set to loopback. For example, MER 50b may send an in-band message packet on first upstream tunnel 76, and the TEID (UL-TEID-1) can be embedded in the payload of the packet. (The message can be embedded in the payload such that a GGSN/PGW would be able to determine the TEID of first upstream tunnel 76.)

In 504, when the packet arrives at an SGSN, the SGSN treats the packet as any other UE packet by changing the TEID and communicating the packet to an appropriate GGSN. (Note that the contents of the embedded payload are not modified by the SGSN, simply the outer tunnel is modified.) For example, SGSN/SGW 34b may change the outer tunnel TEID from UL-TEID-1 to UL-TEID-3 and communicate the packet to GGSN/PGW 54a. In 506, when the packet arrives at the GGSN, the GGSN intercepts and interprets the in-band message packet. For example, when the packet arrives at GGSN/PGW 54a, GGSN/PGW 54a intercepts and interprets the in-band message packet.

In 508, the GGSN can add TEID bindings (as well as other parameters such as the assigned IP address of the UE) and perform the requested loopback function. In a particular embodiment, the GGSN may add TEID-3/4 mapping to the payload of the message (if the MER did not include such information in the message) before performing the loopback. In 510, the GGSN can communicate the loopback packet to the appropriate SGSN, which forwards it to an appropriate RNC. For example, using first downstream tunnel 80, GGSN/PGW 54a may communicate the in-band loopback packet to SGSN/SGW 34b and SGSN/SGW 34b may communicate the in-band loopback packet to RNC 32e. In 512, when the loopback packet arrives at the MER (in route to the RNC), the MER intercepts and interprets the embedded message, which may include the TEIDs bindings (as well as other parameters, such as the assigned IP address to the subscriber). At this point, MER 50*b* understands which UE's 12*a* traffic is to be controlled, and is ready to enforce policies being dictated (e.g., by GGSN/PGW 54*a*) for UE's 12*a* traffic.

In a particular embodiment, the TEID discovery procedure described above may be repeated when the TEIDs at MER 50*b* become stale due to inactivity/timeout, or when TEID conflicts are detected (such as the same TEID is reused by another subscriber after UE 12*a* has become dormant). The TEID discovery procedure may not be needed in the case of DT deployments in which just one pair of TEIDs can be used, where both the GGSN/PGW 54*a* and MER 50*b* identify the same pair. The TEID discovery procedure can be used with non-DT deployments.

Figure 6A:
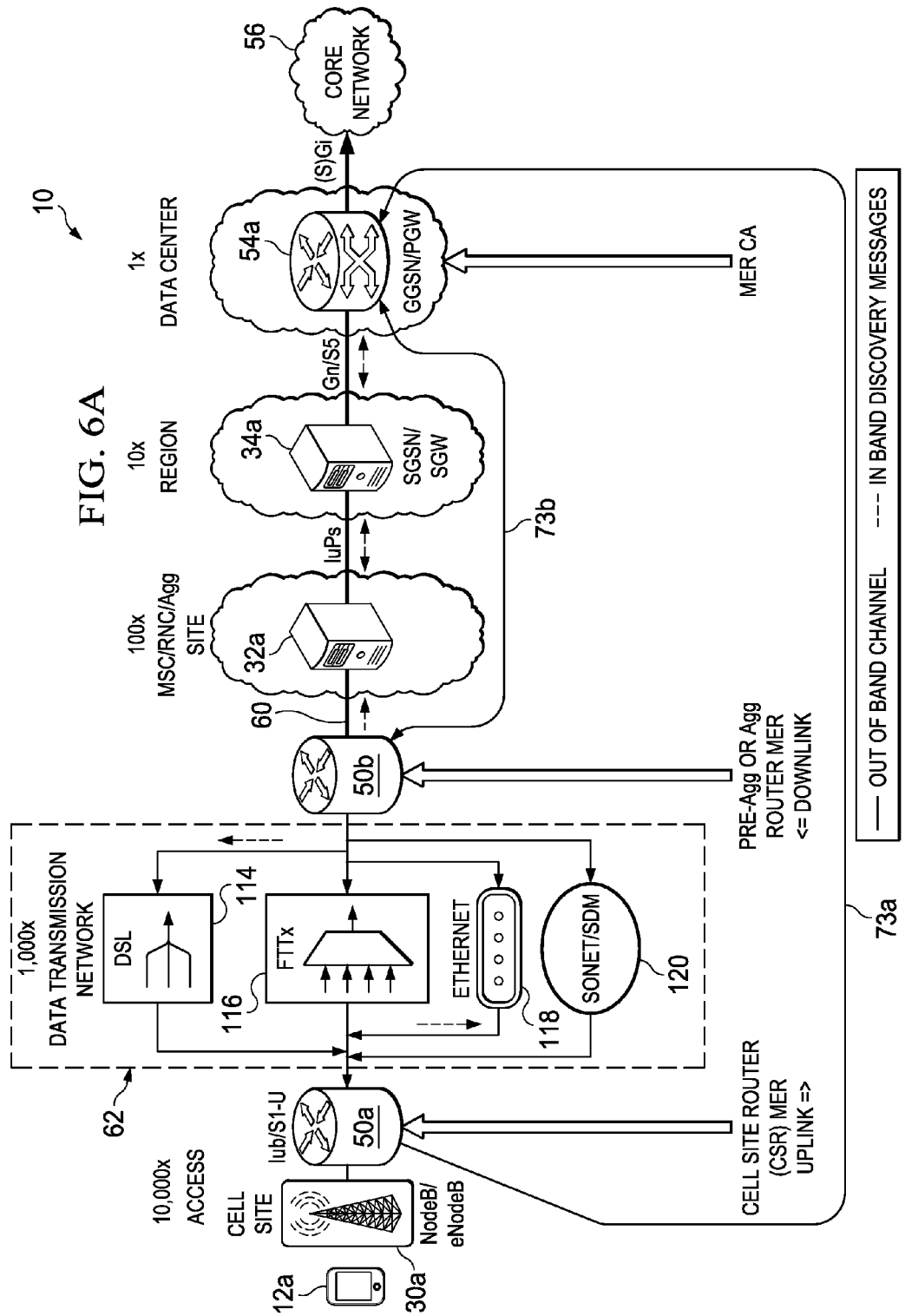
FIG. 6A is another simplified block diagram illustrating one potential operation associated with one embodiment of the present disclosure.

Turning to FIG. 6A, FIG. 6A is a simplified block diagram of communication system 10, which (in this particular implementation) includes UE 12*a*, cell site 30*a*, MER 50*a*, MER 50*b*, RNC 32, SGSN/SGW 34*a*, GGSN/PGW 54*a*, and a data transmission network 62. MER 50*a* can be in communication with GGSN/PGW 54*a* through out-of-band signaling channel 73*a*. MER 50*b* can be in communication with GGSN/PGW 54*a* through out-of-band signaling channel 73*b*. In one particular embodiment, data transmission network 62 may include service provider digital subscriber line (DSL) network 114, fiber to the x (FTTx) network 116 (which is a generic term for any broadband network architecture that uses optical fiber in last-mile), Ethernet network 118, and a synchronous optical networking/synchronous digital hierarchy (SONET/SDM) network 120. Each network in data transmission network 62 may have a cost-to-quality ratio, where the cost of using the network is related to the quality of the network.

Data transmission network 62 represents a series of points or nodes of interconnected communication paths for receiving and transmitting packets of information that propagate through communication system 10. Data transmission network 62 offers a communicative interface between sources and/or hosts, and may be any local area network (LAN), wireless local area network (WLAN), metropolitan area network (MAN), Intranet, Extranet, WAN, virtual LAN (VLAN), virtual private network (VPN), or any other appropriate architecture or system that facilitates communications in a network environment. Data transmission network 62 may implement a UDP/IP connection and use a TCP/IP communication language protocol in particular embodiments of the present disclosure. A network can comprise any number of hardware or software elements coupled to (and in communication with) each other through a suitable communications medium. Data transmission network 62 may include the network elements to facilitate data transmission on communication system 10.

Note that DSL network 114, FTTx network 116, Ethernet network 118, and SONET/SDM network 120 may each contain network elements in a particular embodiment of the present disclosure. Each network element may include any suitable hardware, software, components, modules, interfaces, or objects operable to exchange information in a network environment.

In a particular embodiment, certain classes of traffic are defined such that low quality traffic propagates over one network (for example, data may be sent over a low quality network such as DSL network 114) while high quality traffic propagates over another network (for example, a voice call may be sent over a high quality network such as SONET/SDM network 120). Traffic may be sent over a path based on a variety of factors such as a type or level of service purchased by a user, the type of data, the current amount of traffic on a specific network, etc. Because both MER 50*a* and MER 50*b* should know which type of data should be sent on a network, GGSN/PGW 54*a* should send a discovery message to MER 50*a* and MER 50*b* in order to establish communications with MER 50*a* and MER 50*b*. The discovery process is similar to the discovery process described above except, both MER 50*a* and 50*b* should be discovered. When the discovery message reaches MER 50*b*, MER 50*b* communicates the discovery message to MER 50*a*. After receiving the discovery message MER 50*a* establishes out-of-band channel 73*a* with GGSN/PGW 54*a* and MER 50*b* establishes out-of-band channel 73*b* with GGSN/PGW 54*a* and each identifies themselves to GGSN/PGW 54*a*.

For example, once a user session has been established using UE 12*a*, and traffic for that session is a candidate for selective backhaul link routing, GGSN/PGW 54*a* can identify the upstream MER (MER 50*a*) and the downstream MER (MER 50*b*). To identify MER 50*a* and MER 50*b*, GGSN/PGW 54*a* can use a downstream MER discovery procedure, whereby GGSN/PGW 54*a* sends an in-band discovery message towards UE 12*a*. The in-band discover message is communicated along default path 60 to MER 50*b* (pre-agg/agg router), as well as to MER 50*a* (cell site router, provided there is one cell site router per cell site (which is normally the case)).

Both MER 50*a* and MER 50*b* can identify themselves to GGSN/PGW 54*a* and establish out-of-band channels 73*a* and 73*b* respectively. Out-of-band channel 73*a* can be used by GGSN/PGW 54*a* to instruct MER 50*a* about which upstream traffic should be sent over which link. Out-of-band channel 73*b* can be used by GGSN/PGW 54*a* to instruct MER 50*b* about which downstream traffic should be sent over which link. In addition, in a particular embodiment, MER 50*b* is identified, and a GRE tunnel (e.g., GRE tunnel 84 (not shown)) is created between MER 50*b* and GGSN/PGW 54*a*.

In a particular embodiment, MER 50*a* and/or MER 50*b* may communicate to GGSN/PGW 54*a* about specific links available. GGSN/PGW 54*a* can then specify which links to use for particular types of traffic. In another particular embodiment, GGSN/PGW 54*a* can simply communicate pre-defined classes of traffic to MER 50*a* and MER 50*b*. MER 50*a* and/or MER 50*b* can then map those classes of traffic to suitable backhaul links available (e.g., "low quality Internet," "high quality TDM," etc.).

In one particular embodiment, MER 50*a* can establish a backhaul link selection for the upstream traffic. To achieve the backhaul link selection, MER 50*a* can perform upstream TEID discovery as described above (except, because end user traffic is not necessarily broken out, but rather just backhauled differently, there is no new IP address and associated NAT bindings being established). [Note that this makes the overall scheme somewhat simpler than a general MER and TEID discovery procedure (including handover), since routing (backhaul) paths can be changed on the fly without affecting an established session (in contrast to the anchor breakout described in the general MER solution).]

Once the signaling described above has been completed, downstream traffic for a particular session may be communicated over different paths by the pre-agg/agg MER (MER 50*b*), in accordance with the instructions provided by GGSN/PGW 54*a*. Similarly, upstream traffic may be communicated over different upstream paths by the cell site MER (MER 50*a*), in accordance with instructions provided by GGSN/PGW 54*a*. By routing traffic across an appropriate network, an acceptable cost-to-quality ratio may be achieved for the architecture.

Figure 6B:
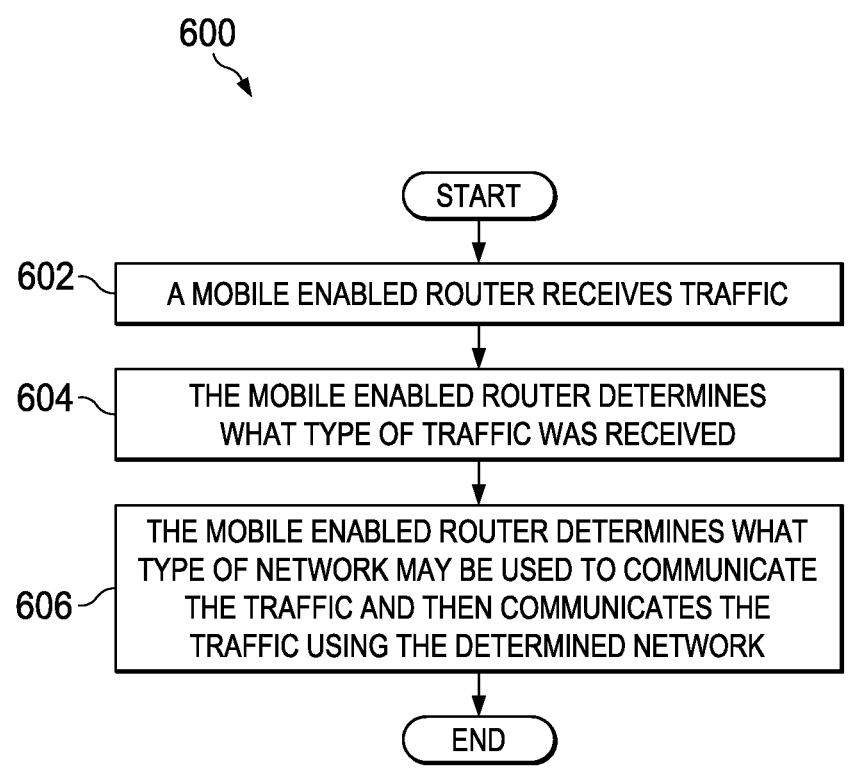
FIG. 6B is another simplified flow diagram illustrating potential operations associated with one embodiment of the present disclosure.

Turning to FIG. 6B, FIG. 6B is a simplified flowchart 600 illustrating one potential operation associated with the present disclosure. In 602, a MER receives network traffic. For example, MER 50a may receive traffic from cell site 30a. In 604, the MER can determine which type of traffic was received. In 606, the MER determines which type of network may be used to communicate the traffic and, subsequently, communicates the traffic using the determined network. For example, MER 50a may determine that the traffic is data traffic and that DSL network 114 can be used to communicate the traffic. MER 50a may then communicate the traffic over DSL network 114.

Dormant Mode

Turning to FIG. 7A, FIG. 7A is a simplified block diagram of communication system 10, which (in this particular implementation) includes UE 12a, cell sites 30a-d, RNCs 32a-g, MERs 50a-c, SGSN/SGWs 34a-c, and GGSN/PGWs 54a-c. First, upstream tunnel 76 and first downstream tunnel 82 connects RNC 32e with SGSN/SGW 34b. Second, upstream tunnel 78 and second downstream tunnel 80 connects SGSN/SGW 34b with GGSN/PGW 54a.

Mobile terminals often shift to dormant mode to save power. Note that the term 'dormant' as used herein in this Specification encompasses any type of staleness characteristic, timeout, timing parameter expiration, or any other suitable characteristic that would be indicative of some type of dormancy. During dormancy events, the assigned first upstream tunnel 76 and first downstream tunnel 82 between RNC 32e and SGSN/SGW 34b can be released. The first upstream tunnel 76 and first downstream tunnel 82 may be reassigned to other subscribers. In certain deployment scenarios, specifically when direct tunneling is employed, GGSN/PGW 54a can become aware of such events and instruct MER 50b accordingly. However, in a general deployment case, it is possible that neither GGSN/PGW 54a nor MER 50b know that the first upstream tunnel 76 and first downstream tunnel 82 have been released (and possibly reassigned). [Note that second upstream tunnel 78 and second downstream tunnel 80 may stay active during this process.]

Therefore, the MERs (upstream and downstream, if present) may maintain an inactivity timer used to detect potentially stale TEIDs. The inactivity timer may be preset based on the time it would take for an endpoint (and thus a GTP-U tunnel) to be deemed dormant. In addition, the MERs may use a stale state that checks for TEIDs being assigned to another user prior to expiration of the inactivity timer. If the inactivity timer has expired or if a TEID has been assigned to another user (stale state is set), then the discovery procedure can be triggered again to determine the new TEIDs. In a particular embodiment, the downstream tunnel may be identified as dormant based on a stale state setting, for example, due to a GTP-U error indication received from a radio network controller.

Turning to FIG. 7B, FIG. 7B is a simplified block diagram of communication system 10, which (in this particular implementation) includes UE 12a, RNC 32e, MER 50b, SGSN/SGW 34b, and GGSN/PGW 54a. In one example, an UE active indicator 96 illustrates that UE 12a is active. First upstream tunnel 76 and first downstream tunnel 82 connect RNC 32e with SGSN/SGW 34b and second upstream tunnel 78 and second downstream tunnel 80 connect SGSN/SGW 34b with GGSN/PGW 54a.

In another example, an UE inactive indicator 98 illustrates that UE 12a is not active and first upstream tunnel 76 and first downstream tunnel 82 have been released. Because the tunnels have been released and are no longer active, MER 50b is unable to route any data to UE 12a. If MER 50b does not receive any data from or destined to UE 12a during this state, the issue is not a problem. However, if such traffic is received at MER 50b, then new tunnels should be established for the data to reach UE 12a. In yet another example, an UE re-active indicator 100 illustrates that UE 12a has been reactivated and a new first upstream tunnel 86 and a new downstream tunnel 92 have been created.

Using a dormant detection process, where the inactivity timer and the stale state are monitored, MER 50a is able to determine that first upstream tunnel 76 and second downstream tunnel 82 have been released, and new first upstream tunnel 86 and new second downstream tunnel 92 have been created. If MER 50a determines that first upstream tunnel 76 and second downstream tunnel 82 have been released, MER 50a can send an in-band message to GGSN/PGW 54a to obtain the new association/binding of new first upstream tunnel 86 and new second downstream tunnel 92 through the existing tunnels (tunnels 78 and 80). From GGSN/PGW 54a, MER 50b is able to determine the TEID for new first upstream tunnel 86 and new downstream tunnel 92, and route data to/from the user device.

Figures 1, 7C:
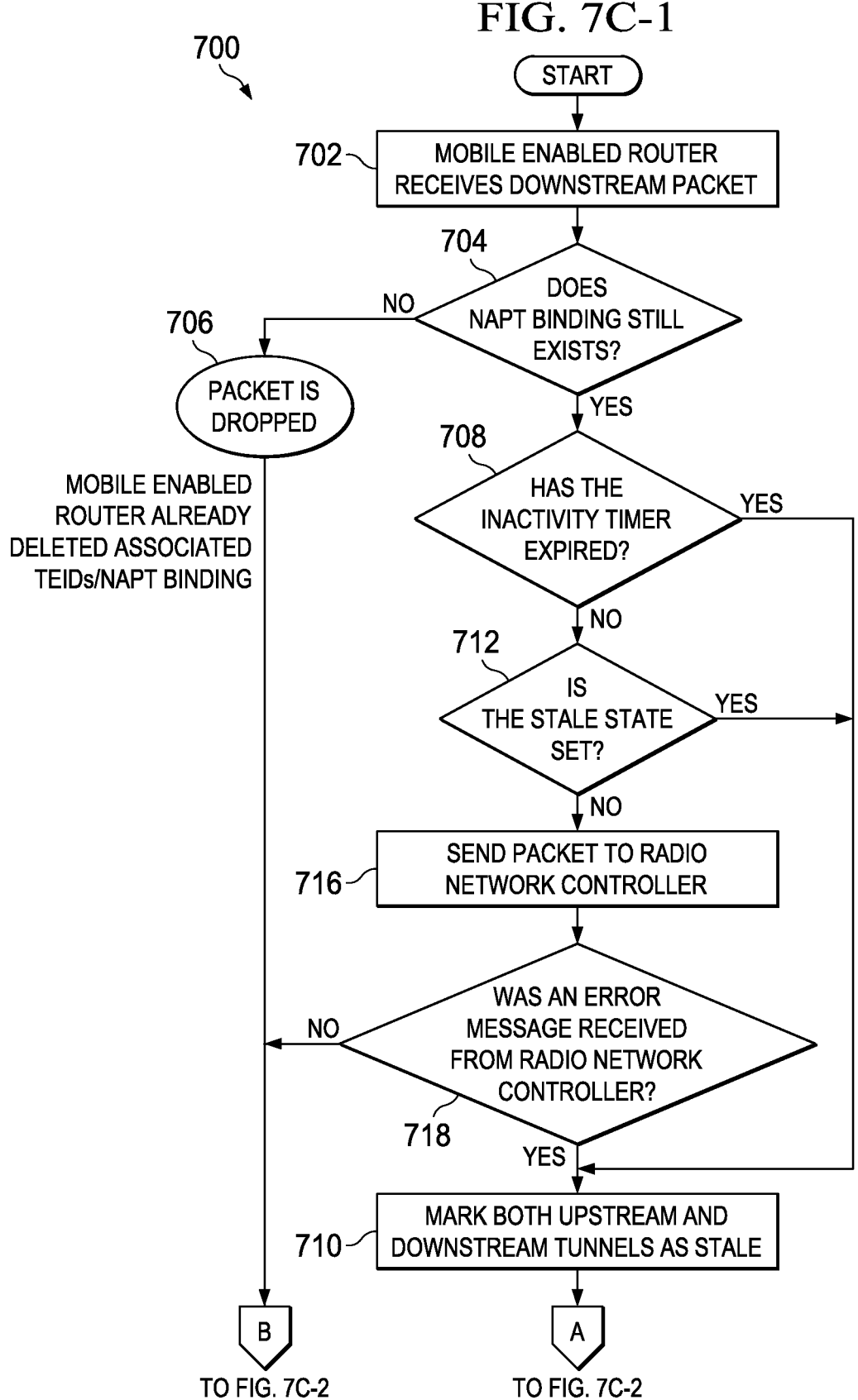
Figures 2, 7C:
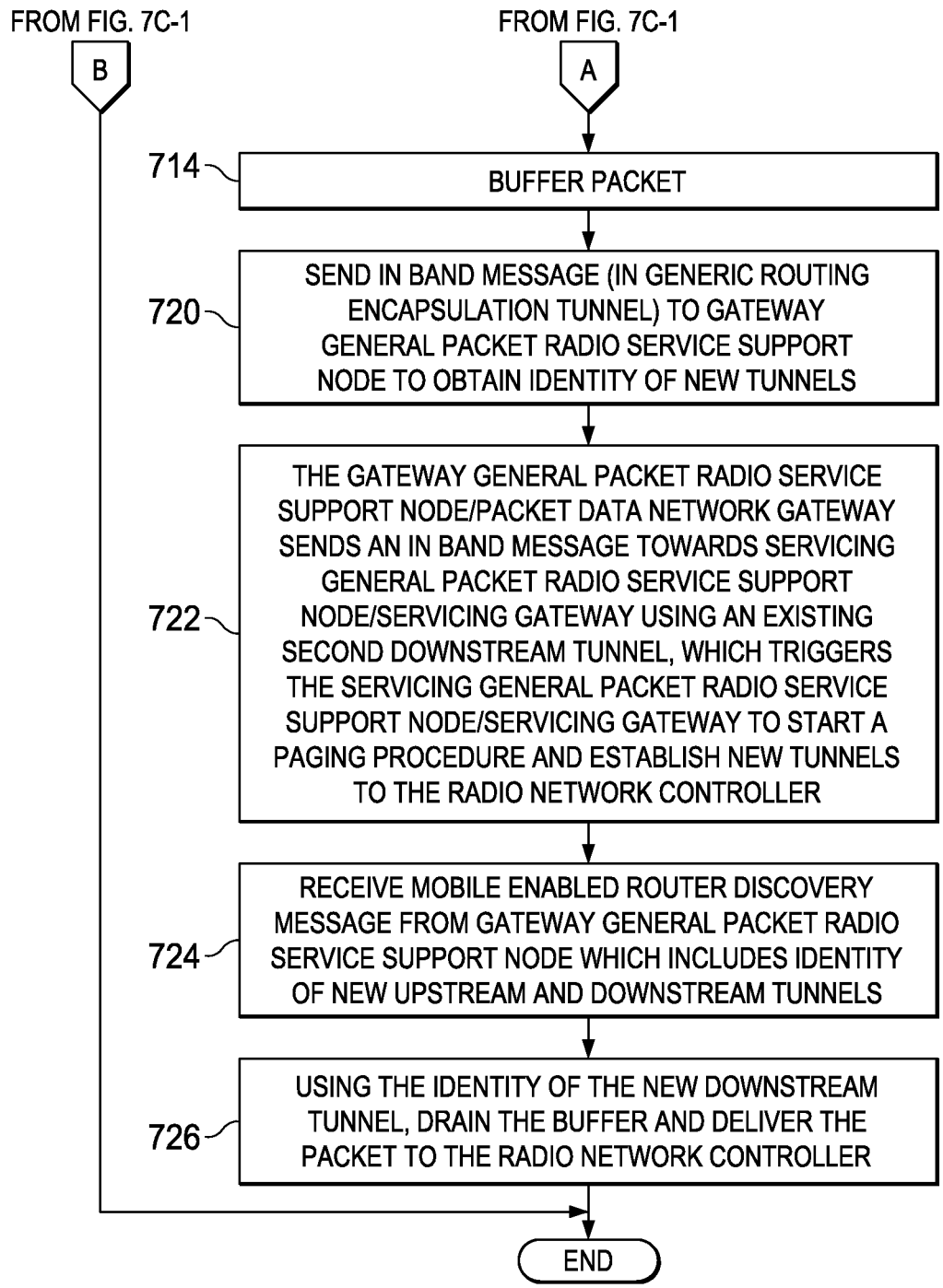

Turning to FIG. 7C, FIG. 7C is a simplified flowchart 700 illustrating one potential operation associated with the present disclosure. (Note that FIG. 7C (due to its length) has been broken into two segments: 7C-1, 7C-2.) In 702, a MER receives a downstream packet. For example, MER 50a may receive a downstream packet from default path 60, or from breakout path 106 that was created when a packet was offloaded. In 704, the MER determines if network address and port translation (NAPT) binding still exists. If NAPT binding does not still exist, then the packet is dropped, as in 706. If NAPT binding does still exist, then the MER determines if an inactivity timer has expired, as shown in 708. If the inactivity time has expired, then both upstream and downstream tunnels are marked as stale, as shown in 710 and the packet is buffered (depicted in 714). If the inactivity timer has not expired, then the MER determines if the stale state is set, as shown in 712.

If the stale state is not set, then the MER sends the packet to an RNC, as illustrated in 716. In 718, the MER then determines if an error message is received from the RNC (indicating that the downstream tunnel TEID is not correct or no longer valid.) If an error message was not received, then the MER considers the downstream tunnel TEID to be correct. If an error message was received, then both upstream and downstream tunnels are marked as stale, as shown in 710, and the packet is buffered, as depicted in 714. In 720, the MER sends an in-band message to a GGSN/PGW to obtain the identity of the new tunnels. For example, MER 50a may send an in-band message to GGSN/PGW 54a using GRE tunnel 84. In 722, the GGSN/PGW sends in-band message towards a SGSN/SGW 34b using an existing second downstream tunnel, which triggers the SGSN/SGW to start a paging procedure and establish new tunnels to the RNC. For example, GGSN/PGW 54a may send an in-band message towards SGSN/SGW 34b using existing second downstream tunnel 80, which triggers SGSN/SGW 34b to start a paging procedure and establish new tunnels (86 and 92) to RNC 32e. In 724, the MER receives a MER discovery message from the GGSN that includes the TEID of the new upstream and downstream tunnels. In 726, using the TEID of the new tunnels, the buffer is drained and the packet is sent to the RNC.

IP Routing

Turning to FIG. 8A, FIG. 8A is a simplified block diagram of communication system 10, which (in this particular implementation) includes UE 12a, cell sites 30a-c, RNC 32, MER 50a-c, SGSN/SGW 34, GGSN/PGW 54, first upstream tunnel 76, second upstream tunnel 78, first downstream tunnel 80, second downstream tunnel 82, out-of-band channel 73, GRE tunnel 84, core network 56, and Internet 58. FIG. 8A further includes an IP point of attachment 124.

In accordance with one example implementation, packets from UE 12a are communicated to MER 50a. Based on instructions from GGSN/PGW 54, MER 50a determines which traffic to offload, where it uses IP-based routing to act as an anchor point. The offloaded traffic 108 is communicated on breakout path 106. Use of IP-based routing, allows for mid-flow breakout of traffic and also avoids NAT-ing at MER 50a. MER 50a can act as an upstream router instead of incurring the cost of the mobile plane, as the routing offload point is where the subscriber is hosted and MER 50a acts as the upstream point to external networks (such as Internet 58).

Data can be routed from its source to its destination through a series of routers, and across multiple networks. IP Routing is an umbrella term for the set of protocols that determine the path that data follows in order to travel across multiple networks from its source to its destination. The IP Routing protocols enable MERs 50 and routers 52 to build up a forwarding table that correlates final destinations with next hop addresses. These protocols can include Border Gateway Protocol (BGP), Intermediate System-Intermediate System (IS-IS), Open Shortest Path First (OSPF), Routing Information Protocol (RIP), etc. When an IP packet is to be forwarded, a router uses its forwarding table to determine the next hop for the packet's destination (based on the destination IP address in the IP packet header), and forwards the packet appropriately. The next router then repeats this process using its own forwarding table, and so on until the packet reaches its destination. At each stage, the IP address in the packet header is sufficient information to determine the next hop; no additional protocol headers are required.

In a particular embodiment, MER 50a assigns IP addresses to each traffic flow for which MER 50a serves as the anchor router. In a particular embodiment, a range of IP addresses that are the last hop for MER 50a or GGSN/PGW 54 (which can be configured at different regularities) are assigned to each traffic flow. In another particular embodiment, IP addresses are dynamically distributed between MER 50a and GGSN/PGW 54. The assigned IP address allows for traffic to be returned to either MER 50a or GGSN/PGW 54.

In a particular embodiment, traffic is de-capsulated at MER 50a. MER 50a can determine if a de-capsulated packet matches an inner IP access control list, a TEID, or both. For example, for global ACL configurations for PDPs, inner destination IP address is not at the provider content network (i.e., traffic is toward distributed or Internet content), and for per-PDP ACL, a 5-tuple match for inner IP flow of a PDP context. Further packet analysis on the gateway can be used to determine IP flows of the default bearer, and the secondary PDP/dedicated bearer is set for breakout. If the packet does match, then an IP address can be assigned to the packet such that MER 50a would serve as the anchor or host router. If the packet does not match, then the packet can be communicated to SGSN/SGW 34.

In accordance with one example implementation, MER 50a can receive downstream traffic from Internet 58 and also communicate the traffic to UE 12a. In another example implementation, MER 50a receives downstream traffic from Internet 58; however, based on the type of traffic, services should be applied to the packet flow and MER 50a is not necessarily capable of performing those services. In this case, the operator serviced traffic 122 that needs the services applied (such as transactions or charging (e.g., Layer 7 billing), firewall capabilities, etc.) can be communicated to GGSN/PGW 54 using GRE tunnel 84. In a particular embodiment, the operator-serviced traffic 122 cannot be serviced by GGSN/PGW 54 and the operator-serviced traffic 122 is offloaded to core network 56 for servicing. In this manner, downstream traffic is received by MER 50a and, if further or special services are needed, operator serviced traffic 122 is communicated from MER 50a to GGSN/PGW 54 (using GRE tunnel 84 such that the traffic is offloaded to core network 56). MER 50a may be capable of performing some services depending on the number of data plane levels available on MER 50a.

Figure 8B:
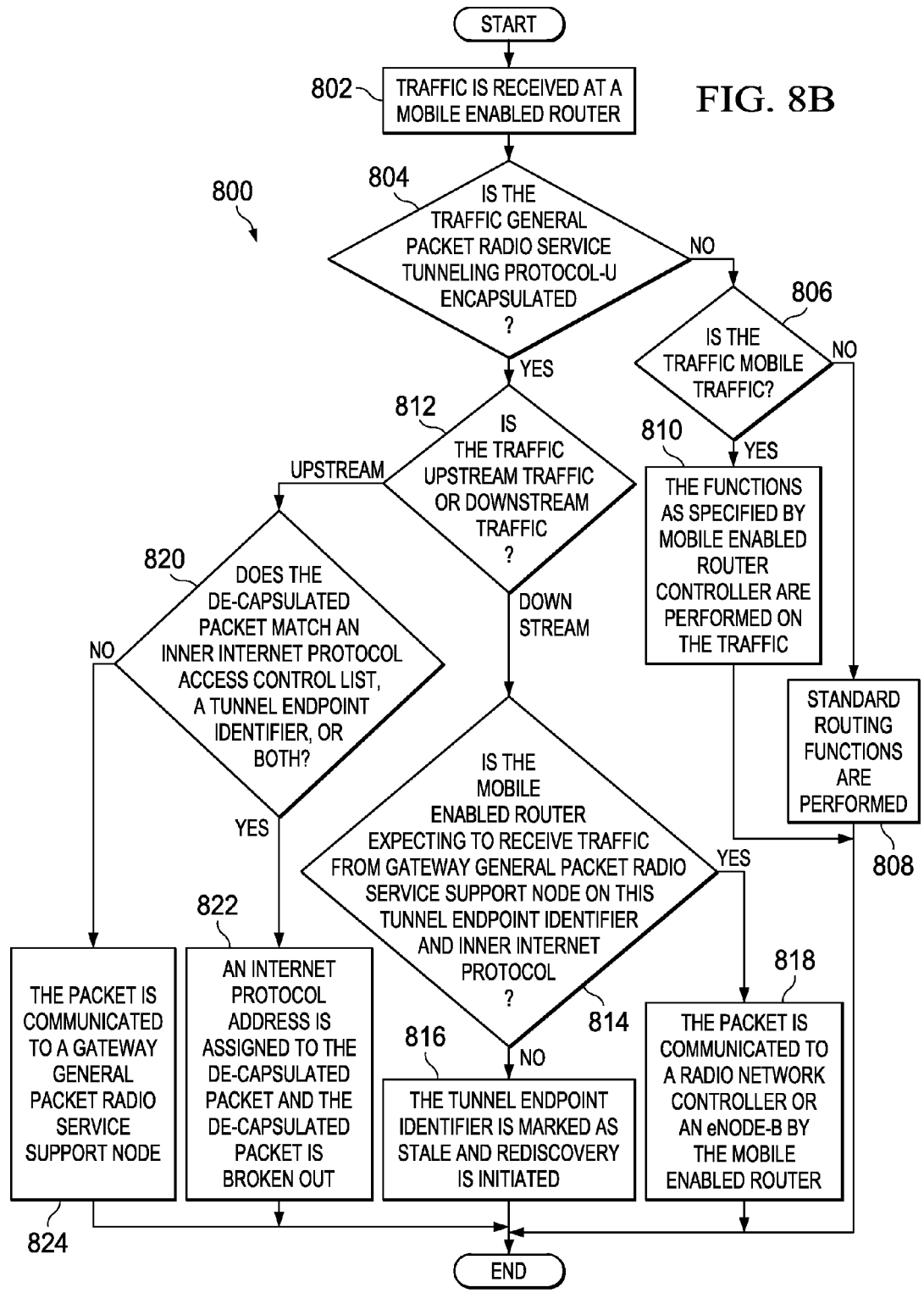
FIG. 8B is another simplified flow diagram illustrating potential operations associated with one embodiment of the present disclosure.

Turning to FIG. 8B, FIG. 8B is a simplified flowchart 800 illustrating one potential operation associated with the present disclosure. In 802, traffic is received at a MER. For example, upstream or downstream traffic may be received at MER 50a. In 804, the MER can determine if the traffic is GTP-U encapsulated. If the traffic is not GTP-U encapsulated, then the MER can determine if the traffic is mobile traffic, at 806. If the traffic is not mobile traffic, then standard routing functions are performed, at 808. If the traffic is mobile traffic, then the functions as specified by a MER-CA are performed on the traffic, at 810. If the traffic is GTP-U encapsulated, then the MER can determine if the traffic is upstream traffic or downstream traffic, at 812.

If the traffic is downstream traffic, the MER can determine if it is expecting to receive traffic from the GGSN on the TEID and inner IP, at 814. If traffic is not expected from the GGSN on the TEID and inner IP, then the TEID is marked as stale and rediscovery is initiated, at 816. If the MER is expecting to receive traffic from the GGSN on the TEID and inner IP, then the packet is communicated to a RNC or an eNode B by the MER, at 818.

If the traffic is upstream traffic, then the MER de-capsulates the packet, and can determine if the de-capsulated packet matches an inner IP access control list, a TEID, or both, as shown in 820. If the MER determines that the de-capsulated packet does match an inner IP access control list, a TEID, or both, then an IP address is assigned to the de-capsulated packet and the de-capsulated packet is broken out, as shown in 822. If the MER determines that the de-capsulated packet does not match an inner IP access control list, a TEID, or both, then the de-capsulated packet is communicated on to a GGSN, as shown in 824. For example, using GRE tunnel 84, MER 50a may communicate to GGSN/PGW 34, a de-capsulated packet that needs a service performed.

Figure 8C:
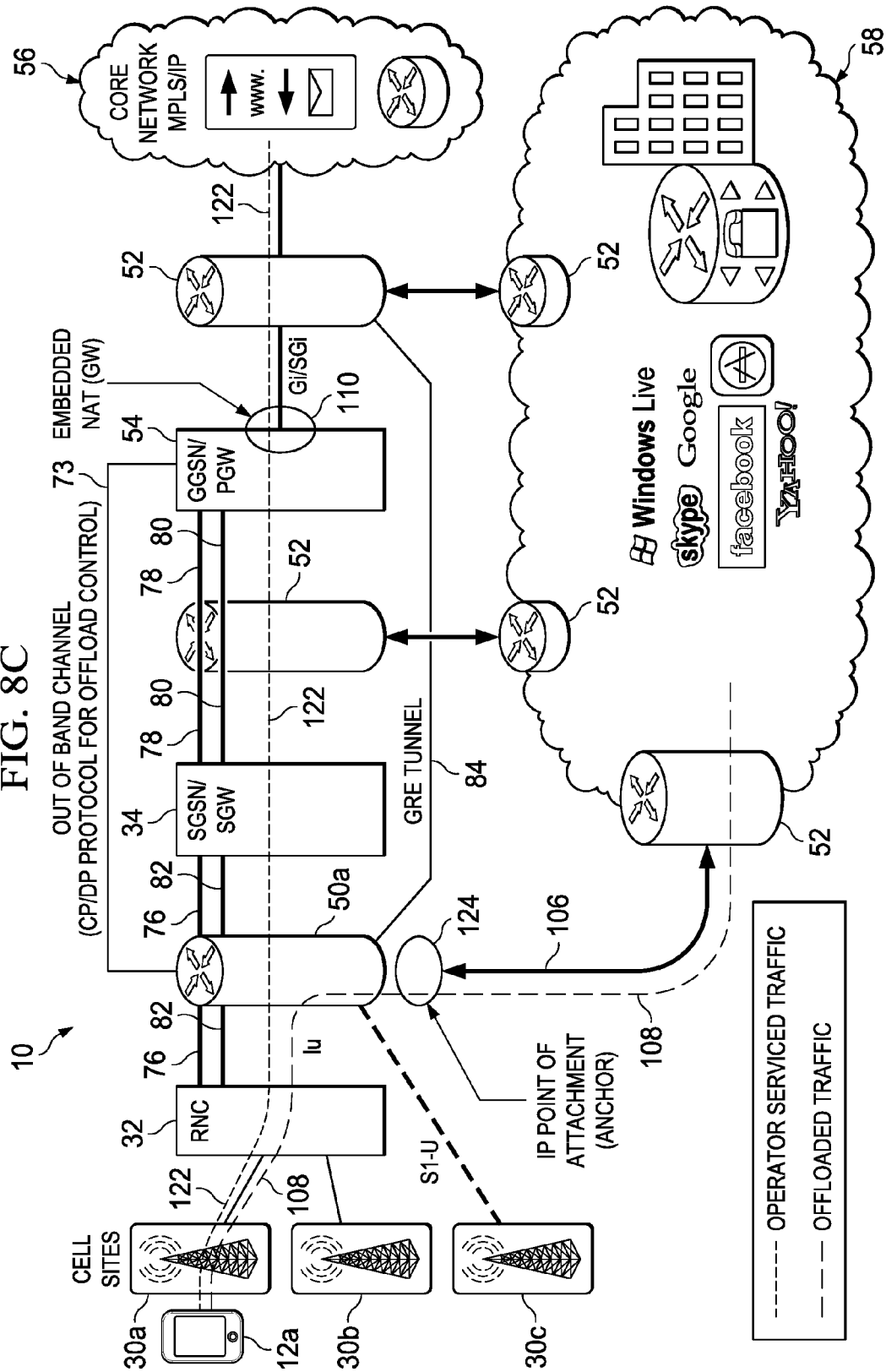
FIG. 8C is another simplified block diagram illustrating one potential operation associated with one embodiment of the present disclosure.

Turning to FIG. 8C, FIG. 8C is a simplified block diagram of communication system 10, which (in this particular implementation) includes UE 12a, cell sites 30a-c, RNC 32, MER 50a-c, SGSN/SGW 34, GGSN/PGW 54, first upstream tunnel 76, second upstream tunnel 78, first downstream tunnel 80, second downstream tunnel 82, out-of-band channel 73, GRE tunnel 84, core network 56, and Internet 58. FIG. 8C may also include an embedded NAT 110. FIG. 8C is similar to FIG. 8A except for the addition of embedded NAT 110. When a packet in the traffic flow needs extra processing outside GGSN/PGW 54 (CDR generation, complex CDRS, voice) and those packets still have the source IP address originally assigned by MER 50a. The addition of embedded NAT 110 can help facilitate the extra processing and ensure the traffic is returned to GGSN/PGW 54.

NAT-ing is the process of modifying IP address information in the IP packet header of the packet in the traffic flow, while the packet is in transit across MER 50a. The simplest type of NAT provides a one-to-one translation of IP addresses (e.g., basic NAT or one-to-one NAT). In this type of NAT, the IP addresses, IP header checksum, and/or any higher-level checksums (that include the IP address) are changed. The rest of the packet can be left untouched (at least for basic TCP/UDP functionality, some higher-level protocols may need further translation).

Basic NATs can be used when there is a requirement to interconnect two IP networks with incompatible addressing. However, it is common to hide an entire IP address space, usually consisting of private IP addresses, behind a single IP address (or in some cases a small group of IP addresses) in another (usually public) address space. To avoid ambiguity in the handling of returned packets, a one-to-many NAT should alter higher-level information such as TCP/UDP ports in outgoing communications and, further, should maintain a translation table so that return packets can be correctly translated back. (e.g., NAPT or port address translation (PAT), IP masquerading, NAT Overload, etc.).

In accordance with one example implementation described in FIG. 8A, downstream traffic ended up at MER 50*a* and MER 50*a* determined whether or not the traffic could be communicated to UE 12*a*, or if the traffic needed to shift to GGSN/PGW 54 for services. When flows are not being offloaded (or flow through the GRE tunnel), and have services applied, in order to return the downstream packets for a user (for a non-broken out flow) NAT 110 assigns the user a different IP address. For example, some complex services can be applied at GGSN/PGW 54 using core network 56.

The upstream traffic with the complex services is communicated to GGSN/PGW 54 and is NAT-ed before it is communicated to core network 56 so the traffic will return to GGSN/PGW 54. Otherwise, the traffic can be offloaded, FIG. 8A, and the source address of the upstream is still the one that was assigned to the user. If the traffic is not uploaded, it still has the source address of the user. Hence, NAT 110 assigns a different IP address before the traffic is sent to core network 56. That new source address allows the packet to return back to the GGSN/PGW 54 and not MER 50*a*.

Figure 8D:
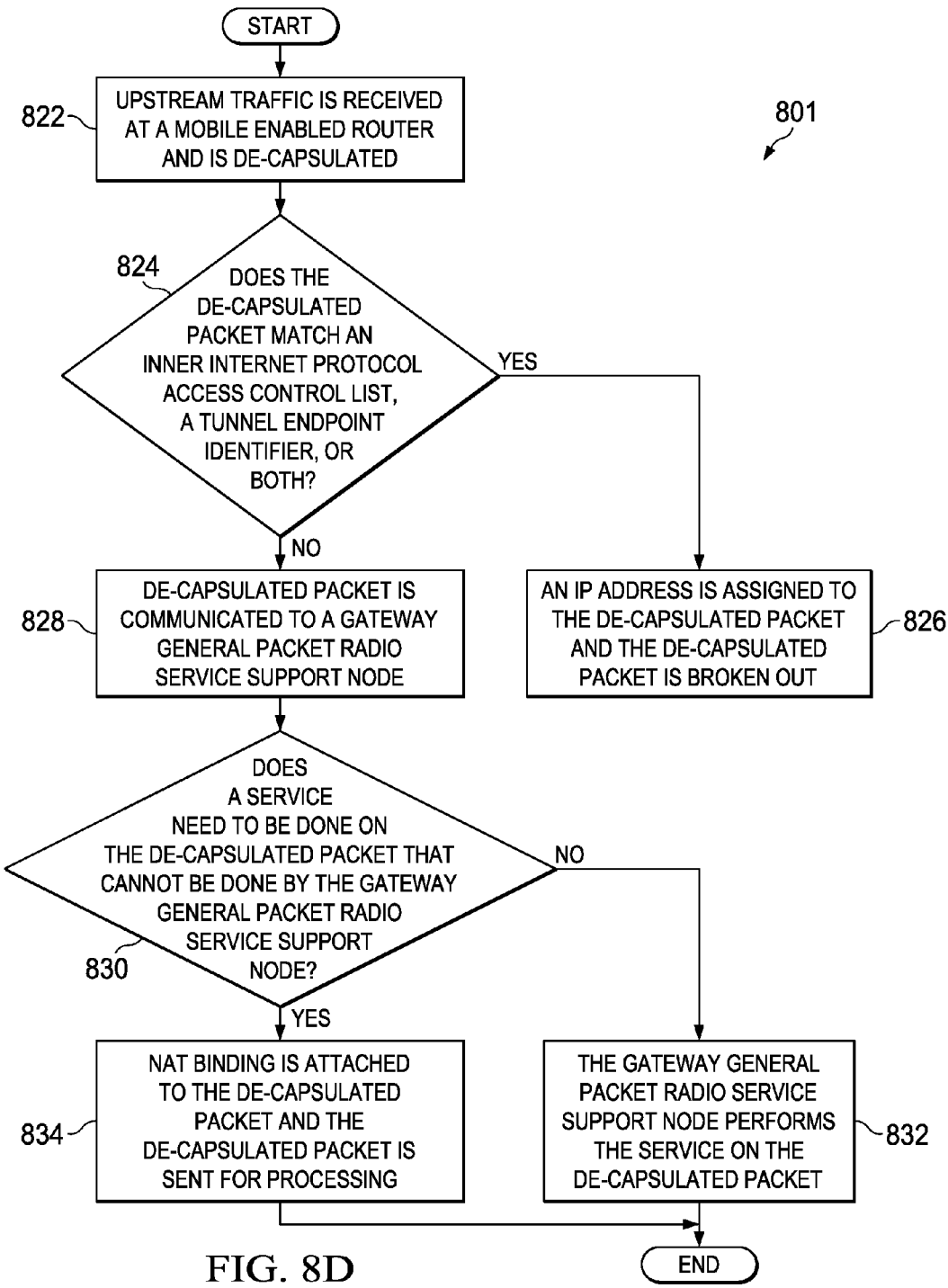
FIG. 8D is another simplified flow diagram illustrating potential operations associated with one embodiment of the present disclosure.

Turning to FIG. 8D, FIG. 8D is a simplified flowchart 801 illustrating one potential operation associated with the present disclosure. In 822, upstream traffic is received at a MER and is de-capsulated. The MER determines if a de-capsulated packet matches an inner IP access control list, a TEID, or both, as in 824. If the MER determines that the de-capsulated packet matches an inner IP access control list, a TEID, or both, then an IP address is assigned to the de-capsulated packet and the de-capsulated packet is broken out, as in 826. If the MER determines that the de-capsulated packet does not match an inner IP access control list, a TEID, or both, then the de-capsulated packet is communicated on to an SGSN/SGW, as in 828. In 830, the GGSN/PGW determines if a service should be performed on the de-capsulated packet that cannot be performed by the GGSN/PGW. If the GGSN/PGW determines that the service cannot be performed by the GGSN/PGW, then NAT binding is attached to the de-capsulated packet and the de-capsulated packed is sent for processing, as in 834. If the GGSN/PGW determines that the service can be performed by the GGSN/PGW, then the GGSN/PGW can perform the service on the de-capsulated packet, as in 832.

NAT Routing

Turning to FIG. 9A, FIG. 9A is a simplified block diagram of communication system 10, which (in this particular implementation) includes UE 12*a*, cell sites 30*a-c*, RNC 32, MER 50*a*, routers 52, SGSN/SGW 34, GGSN/PGW 54, first upstream tunnel 76, second upstream tunnel 78, first downstream tunnel 80, second downstream tunnel 82, out-of-band channel 73, GRE tunnel 84, core network 56, embedded NAT 110, IP point of attachment 124, and Internet 58.

In accordance with one example implementation, packets from UE 12*a* are communicated to MER 50*a*. MER 50*a* determines which traffic to offload and uses embedded NAT 110 to act as an anchor point. Use of NAT allows for a mid-flow breakout of traffic and does not require MER 50*a* to be an anchor point. For example, if UE 12*a* is mobile, MER may be moved to a new MER and the new MER could become the new anchor MER. MER 50*a* acts as the upstream point of attach to external networks (such as Internet 58). When the anchor point moves to the new MER, the IP session may be kept. In a particular embodiment, a tunnel is established between the anchor MER and the new MER to provide a mobile support.

In a particular embodiment, traffic is de-capsulated at MER 50*a*. MER 50*a* determines if a de-capsulated packet matches an inner IP access control list, a TEID, or both. (For example, if global configurations ACL for PDPs: inner destination IP address is not at provider content network (i.e., traffic is toward distributed or Internet content), per-PDP ACL: 5-tuple match for inner IP flow of a PDP context. DPI on GW is used to determine IP flows of PDP context, and entire secondary PDP/dedicated bearer is set for breakout.) If the packet does match, then the inner IP of the packet is NAT-ed such that MER 50*a* will be the anchor router. If the packet does not match, then the packet is communicated to SGSN/SGW 34. Because the packet is NAT-ed, the anchor point for the offloaded packet is MER 50*a*. MER 50*a* receives the offloaded packet as downstream traffic from Internet 58 and communicates the packet to UE 12*a*. In a particular embodiment, MER 50*a* determines if services should be applied to the offloaded packet. If services are necessary, then the offloaded packet may be NAT-ed such that the offloaded packet will return to GGSN/PGW 54 where the services can be applied. Hence, the packet would not be returned to MER 50*a* and then tunneled back to GGSN/PGW 54, the packet would go directly to GGSN/PGW 54.

Figure 9B:
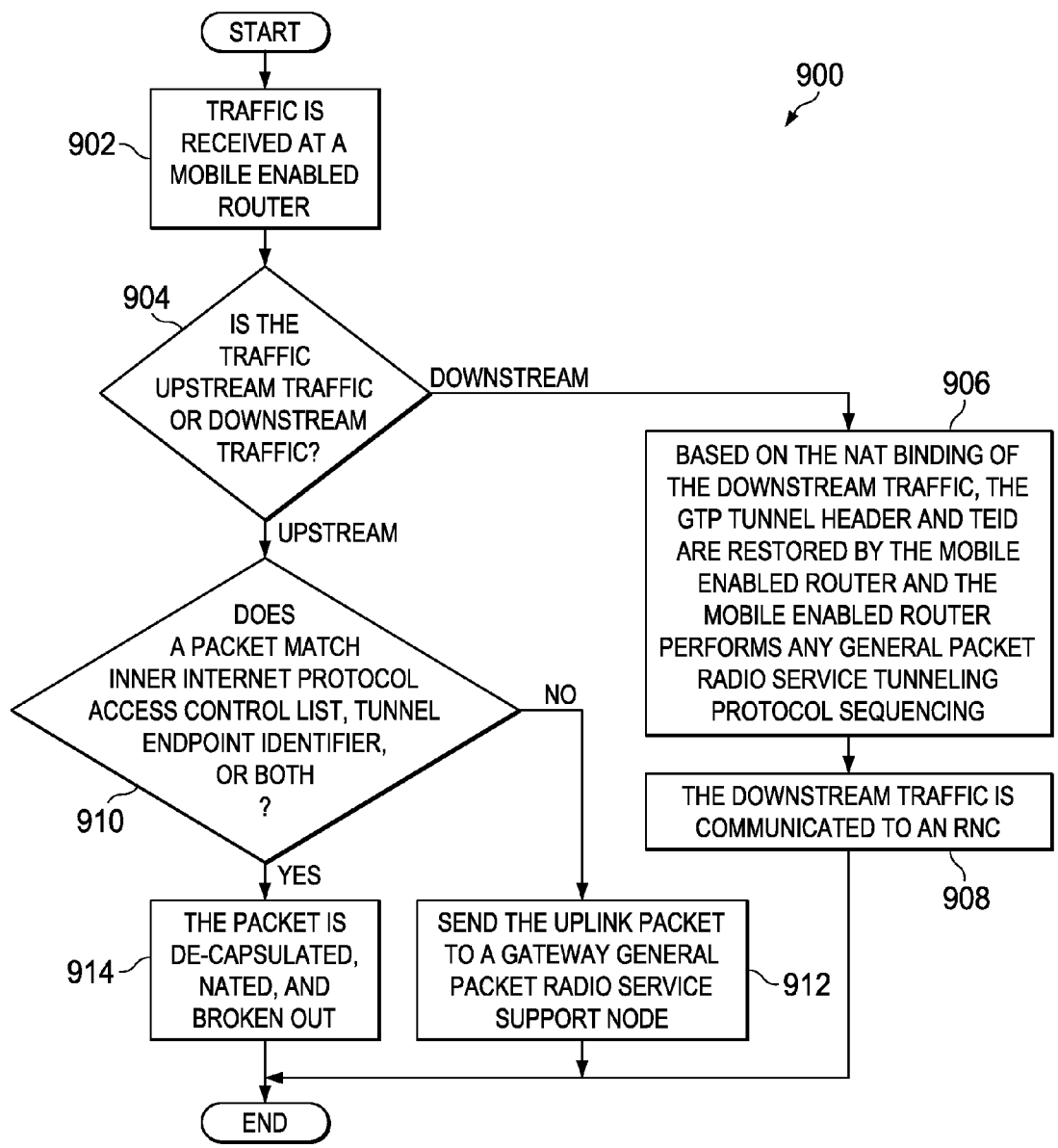
FIG. 9B is another simplified flow diagram illustrating potential operations associated with one embodiment of the present disclosure.

Turning to FIG. 9B, FIG. 9B is a simplified flowchart 900 illustrating one potential operation associated with the present disclosure. In 902, traffic is received at a MER. In 904, the MER determines if the traffic is upstream traffic or downstream traffic. If the traffic is downstream traffic, based on the NAT binding of the downstream traffic, the GTP tunnel header and TEID are restored by the MER and the MER can perform any general packet radio service tunneling protocol sequencing, as in 906. In 908, the downstream traffic is communicated to a RNC.

If the traffic is upstream traffic, the MER determines if a packet matches an inner IP access control list, a TEID, or both, as in 910. If the MER determines that the packet does not match, then the packet is communicated on to an SGSN/SGW, as in 912. For example, if MER 50*a* determines that the packet does not match, then the packet is communicated on to an SGSN/SGW 34. If the MER determines that the packet does match, then the packet is de-capsulated and the de-capsulated packet is NAT-ed and broken out, as shown in 914.

Figure 9C:
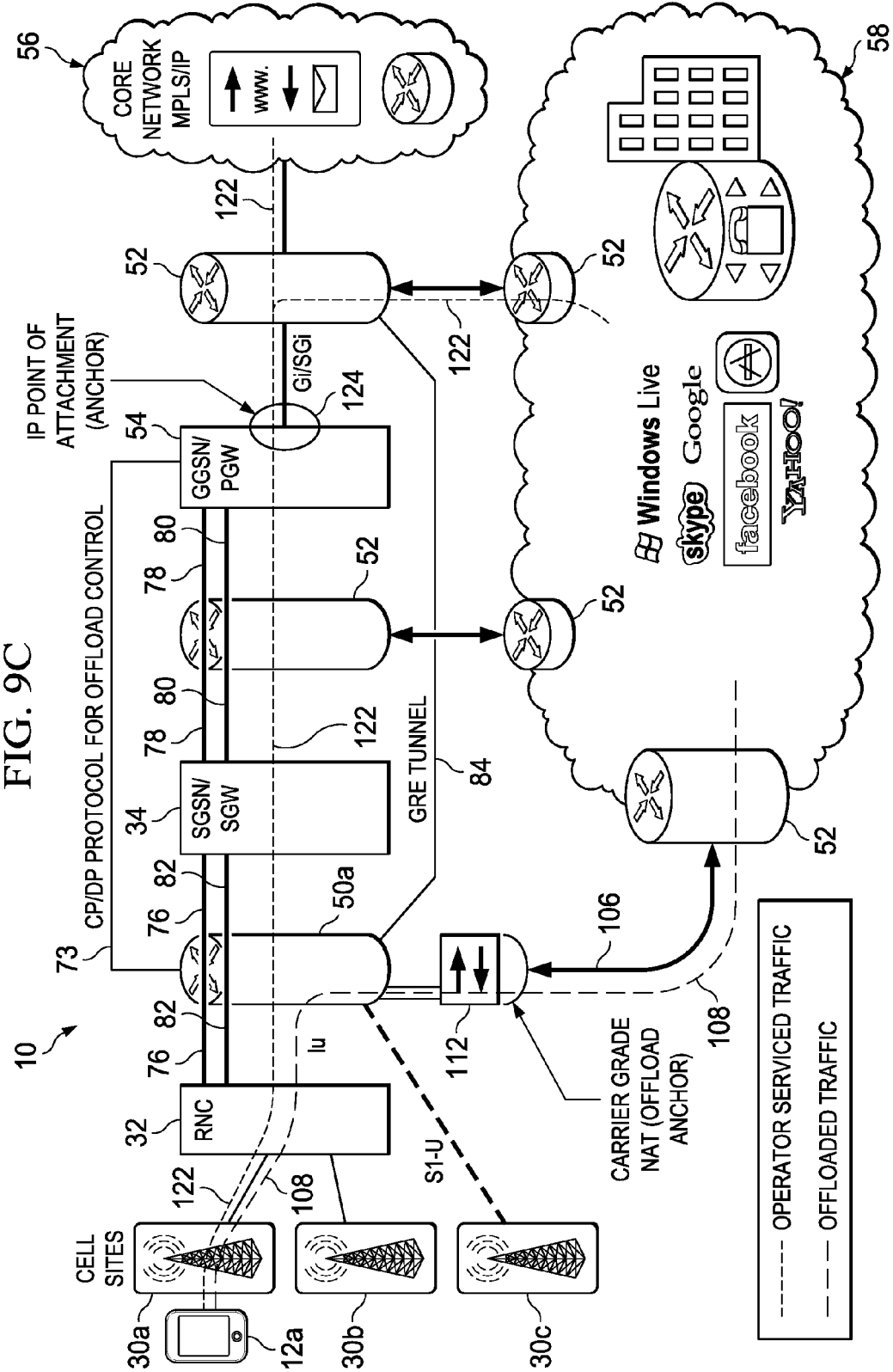
FIG. 9C is another simplified block diagram illustrating one potential operation associated with one embodiment of the present disclosure.

Turning to FIG. 9C, FIG. 9C is a simplified block diagram of communication system 10, which (in this particular implementation) includes UE 12*a*, cell sites 30*a-c*, RNC 32, MER 50*a*, routers 52, SGSN/SGW 34, GGSN/PGW 54, first upstream tunnel 76, second upstream tunnel 78, first downstream tunnel 80, second downstream tunnel 82, out-of-band channel 73, GRE tunnel 84, core network 56, carrier grade NAT (CGN) 112, IP point of attachment 124, and Internet 58. In accordance with one example implementation, packets from UE 12*a* are communicated to MER 50*a*. MER 50*a* determines which traffic to offload and uses carrier grade NAT (CGN) 112 to act as an anchor point.

CGN (sometimes referred to as large-scale NAT (LSN)), is an approach to IPv4 network design where end sites (for example homes) are not given public IPv4 addresses. Instead, the end sites are given private addresses that are translated to public by middleboxes embedded in a network operator's network. This allows the network operator to share a common pool or pools of addresses among several end sites. CGN can also be used for IPv6 as well as translation between IPv4 and IPv6.

Asymmetric Routing

Figure 10A:
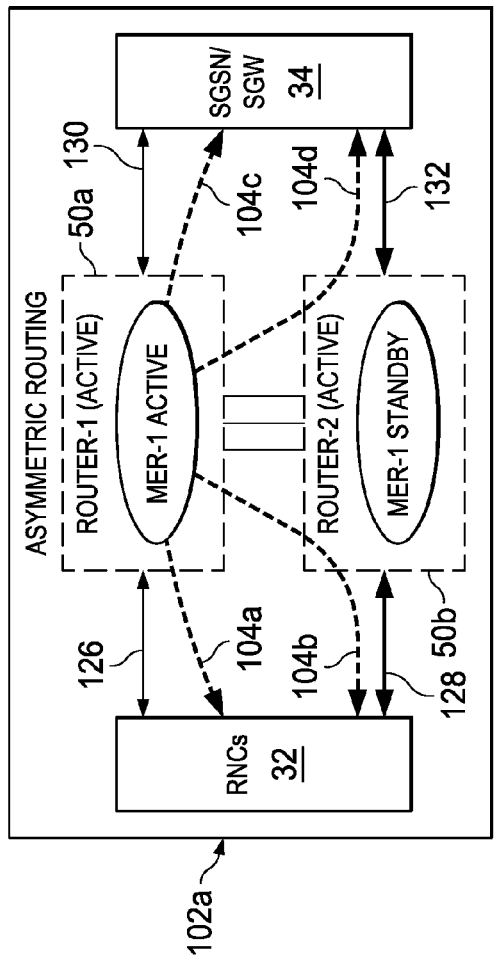
FIG. 10A is another simplified block diagram illustrating one potential operation associated with one embodiment of the present disclosure.

Turning to FIG. 10A, FIG. 10A is a simplified block diagram of a portion of communication system 10 depicting one example of an asymmetric routing 102a. Asymmetric routing 102a can include RNC 32, MER 50a, MER 50b, and SGSN/SGW 34. In this example, link 126 connects RNC 32 with MER 50a, link 128 connects RNC 32 with MER 50b, link 130 connects MER 50a with SGSN/SGW 34, and link 132 connects MER 50b with SGSN/SGW 34.

In some deployments, routers or MERs may be configured to operate in an active/active mode instead of active/standby mode. For example, MER 50a and MER 50b may be configured to operate in an active/active mode where both are active. In this case, UE's traffic may be loadbalanced between MER 50a and MER 50b without UE's awareness. As a result, traffic from one UE may traverse through different routers (or MERs) and the control of such traffic becomes more challenging. In one particular embodiment, policy based routing (PBR) may be used to bring mobile-related traffic to one MER for service enforcement. The service enforcement is in active/standby mode while the routers are in active/active mode. In another particular embodiment, a new function to MER is added such that the service enforcement forwards mobile traffic of specific subscribers to peers responsible for the control of such subscribers.

Figure 10B:
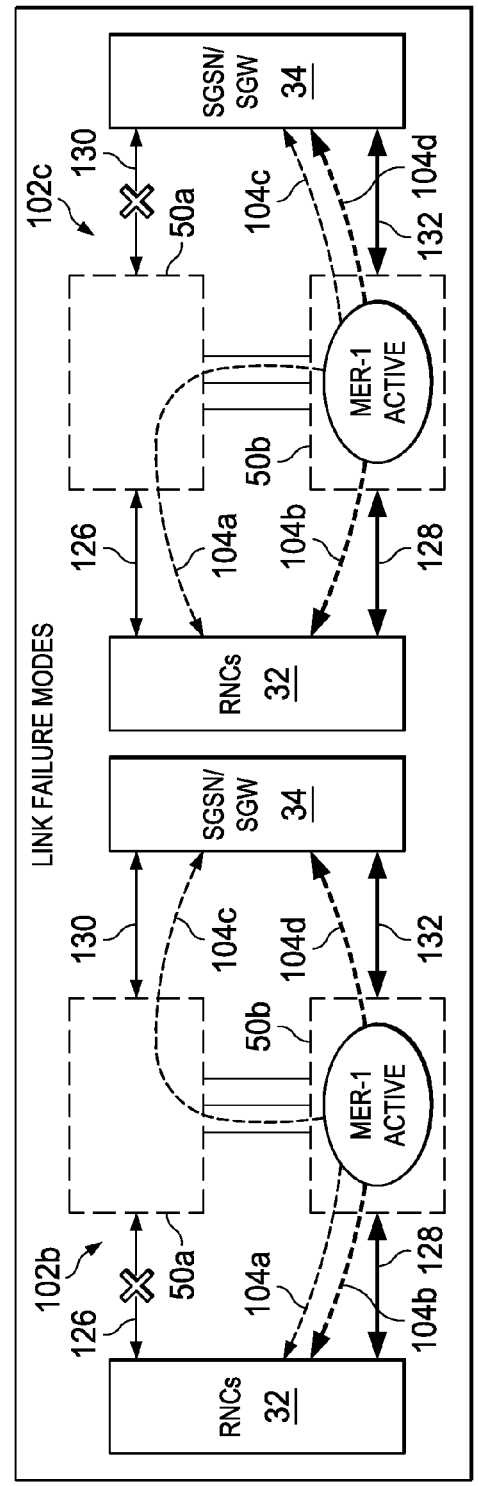
FIG. 10B is another simplified block diagram illustrating one potential operation associated with one embodiment of the present disclosure.

FIG. 10B is a simplified schematic diagram illustrating possible examples of a link (e.g., link 126 or link 130) to MER 50a becoming disabled. For example, 102b depicts link 126 becoming disabled (e.g., due to a loss of connection between RNC 32 and MER 50a). In a particular embodiment, PBR is used to reroute traffic 104a (that was communicated from MER 50a to RNC 32 over link 126) from MER 50b to RNC 32 (over link 128). Because link 130 is still active and not disabled, traffic 104c continues to flow from/to MER 50a to/from SGSN/SGW 34 over link 130.

In a similar example, 102c depicts link 130 becoming disabled (e.g., due to a loss of connection between MER 50a and SGSN/SGW 34). In a particular embodiment, PBR is used to reroute traffic 104c (that was communicated from MER 50a to SGSN/SGW 34 over link 130) from MER 50b to SGSN/SGW 34 over link 132. Because link 126 is still active and not disabled, traffic 104a continues to flow from/to MER 50a to/from RNC 32 over link 126.

FIG. 10C is a simplified schematic diagram illustrating possible examples of a link (e.g., link 128 or link 132) to MER 50b becoming disabled. For example, 102d depicts link 128 becoming disabled (e.g., due to a loss of connection between RNC 32 and MER 50b). In a particular embodiment, PBR is used to reroute traffic 104b (that was communicated from MER 50b to RNC 32 over link 128) from MER 50a to RNC 32 (over link 126). Because link 132 is still active and not disabled, traffic 104d continues to flow from/to MER 50b to/from SGSN/SGW 34 over link 132.

In a similar example, 102e depicts link 132 becoming disabled (e.g., due to a loss of connection between MER 50b and SGSN/SGW 34). In a particular embodiment, PBR is used to reroute traffic 104d (that was communicated from MER 50b to SGSN/SGW 34 over link 132) from MER 50a to SGSN/SGW 34 over link 130. Because link 128 is still active and not disabled, traffic 104b continues to flow from/to MER 50b to/from RNC 32 over link 128.

FIG. 10D is a simplified schematic diagram illustrating two possible examples of a MER (e.g., MER 50a or MER 50b) becoming disabled. For example, 102f depicts MER 50b becoming disabled (e.g., due to a mechanical failure of MER 50b). In a particular embodiment, PBR can be used to reroute traffic 104b that was communicated from MER 50b to RNC 32 over link 128, and to reroute traffic 104d that was communicated from MER 50b to SGSN/SGW 34 over link 132. Because links 126 and 130 are still active and not disabled, traffic can be communicated from MER 50a to RNC 32 over link 126, and to SGSN/SGW 34 over link 130.

In a similar example, 102g illustrates a scenario in which MER 50a has become disabled (e.g., due to a mechanical failure of MER 50a). In a particular embodiment, PBR can be used to reroute traffic 104a that was communicated from MER 50a to RNC 32 over link 126, and reroute traffic 104c that was communicated from MER 50b to SGSN/SGW 34 over link 130. Because links 128 and 132 are still active and not disabled, traffic can be communicated from MER 50b to RNC 32 over link 128, and to SGSN/SGW 34 over link 132.

Figure 10E:
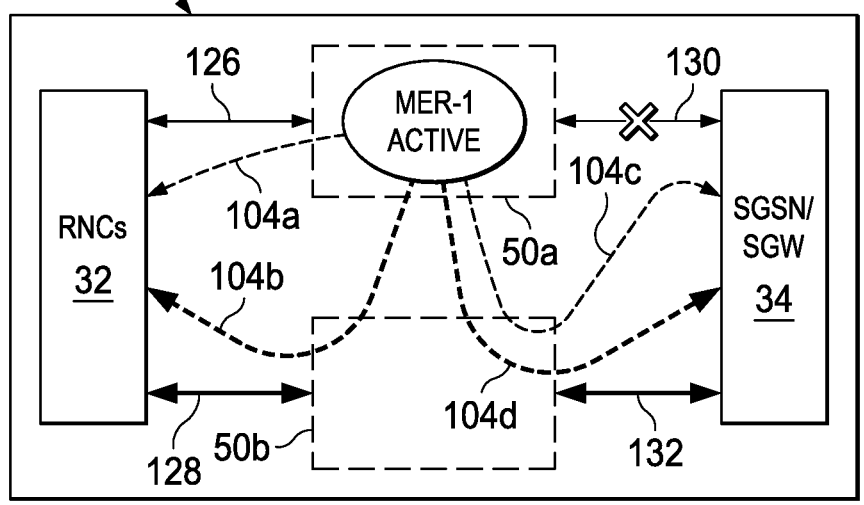
FIG. 10E is another simplified block diagram illustrating one potential operation associated with one embodiment of the present disclosure.

FIG. 10E is a simplified schematic diagram illustrating an example of when link 130 has become disabled (e.g., due to a loss of connection between MER 50a and SGSN/SGW 34) and the link failure does not trigger a MER switchover. As shown in the example, traffic 104a, 104b, 104c, and 104d should first propagate through MER 50a and then be rerouted through MER 50b. As a result, inter-chassis traffic becomes extreme (i.e., may require additional physical links to be installed on both routers).

Figure 10F:
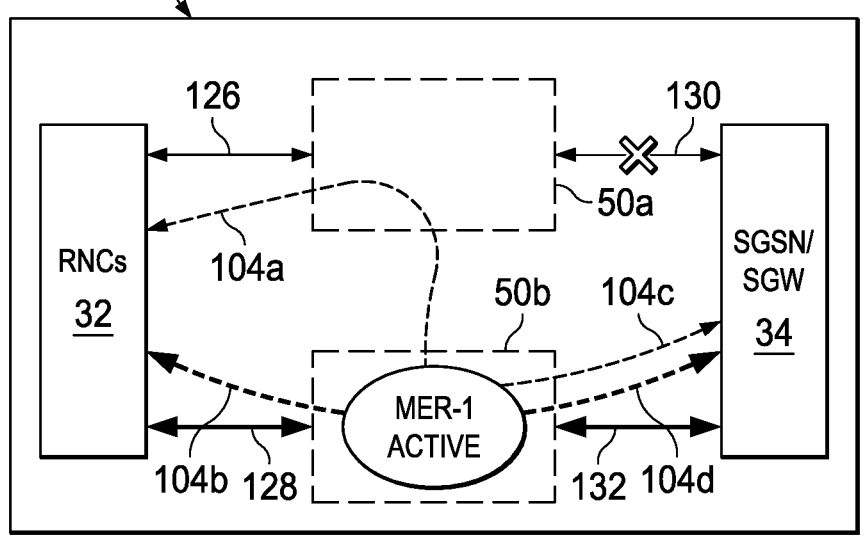
FIG. 10F is another simplified block diagram illustrating one potential operation associated with one embodiment of the present disclosure.

FIG. 10F is a simplified schematic diagram illustrating a graphical example of when link 130 has become disabled (e.g., due to a loss of connection between MER 50a and SGSN/SGW 34), and the link failure triggers a MER switchover. As shown in the example, traffic 104b, 104c, and 104d does not first propagate through MER 50a and then be rerouted through MER 50b. Instead, traffic 104a is routed from MER 50b to MER 50a. As a result, inter-chassis traffic does not becomes extreme (i.e., does not require additional physical links to be installed on both routers). In order to achieve the re-routing of traffic, certain link failures may trigger MER switchover based on configured policies and available inter-chassis bandwidth Turning to FIG. 11, FIG. 11 is a simplified block diagram of an in-band signaling packet 134. In-band signaling packet 134 may include an outer tunnel IP header 136, an inner packet IP header 138, and a payload 140. Fields 102 and fields 142 (or a subset) indicate parameters that can be configured by MER 50a and/or a MER-CA (e.g., GGSN/PGW 54). Fields 144 (or a subset) indicate parameters that should be used without modifications.

Payload 140 may contain in-band protocol data elements. For example, payload 140 may contain the type of message, the IP assigned to UE (e.g., UE 12a), downstream and upstream TEIDs, packet hashes, MER CA and MER Control Plane/Data Plane (CP/DP) address/port to be used, MER and MER CA ID, and future extensions, which can include other elements. The message type may be a MER discovery message, a TEID discovery/loopback, an end-marker, a paging trigger, or future extensions.

Note that in certain example implementations, the data communication and routing functions outlined herein may be implemented by logic encoded in one or more tangible media (e.g., embedded logic provided in an application specific integrated circuit [ASIC], network processors, digital signal processor [DSP] instructions, software [potentially inclusive of object code and source code] to be executed by a processor, or other similar machine, etc.). In some of these instances, a memory element [as shown in FIG. 3A] can store data used for the operations described herein. This includes the memory element being able to store software, logic, code, or processor instructions that are executed to carry out the activities described in this Specification.

A processor can execute any type of instructions associated with the data to achieve the operations detailed herein in this Specification. In one example, the processor [as shown in FIG. 3A] could transform an element or an article (e.g., data) from one state or thing to another state or thing. In another example, the data communication and routing activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, MER 50*a* and/or MER-CA (e.g., GGSN/PGW 54) may include software (e.g., provisioned as traffic offload module 66, MER control module 74, etc.) in order to achieve the data communication functions outlined herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, queues, caches, etc.) should be construed as being encompassed within the broad term 'memory element.' Similarly, any of the potential processing elements, modules, and machines described in this Specification should be construed as being encompassed within the broad term 'processor.' Each of these elements (e.g., MER 50*a* and MER-CA (e.g., GGSN/PGW 54)) can also include suitable interfaces for receiving, transmitting, and/or otherwise communicating data or information in a network environment.

MER 50*a* and MER-CA (e.g., GGSN/PGW 54) are network elements configured to perform the traffic offloading activities disclosed herein. As used herein in this Specification, the term 'network element' may include any suitable hardware, software, components, modules, interfaces, or objects operable to exchange information in a network environment. Further, the term network element as discussed herein encompasses (but is not limited to) devices such as routers, switches, gateways, bridges, loadbalancers, firewalls, inline service nodes, proxies, clients, servers processors, modules, or any other suitable device, component, element, proprietary device, network appliance, or object operable to exchange information in a network environment. This may be inclusive of appropriate algorithms and communication protocols that allow for the effective exchange of data or information.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible scenarios and patterns that may be executed by, or within, communication system 10. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that the architecture outlined herein can be used in different types of network applications. The architecture of the present disclosure can readily be used such environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a data packet using a first tunnel;
   communicating a message in the first tunnel from a first network element, in response to the receiving, the message including tunnel identification binding data identifying the first tunnel;
   receiving a response to the message in a second tunnel, wherein the response contains
      tunnel identification binding data that identifies a third tunnel on a backhaul link, and
      identification data of a second network element;
   establishing an out-of-band channel using the identification data; and
   receiving instructions through the out-of-band channel to determine whether to offload the data packet from the backhaul link and whether to transmit the data packet using the first and third tunnels.

2. The method of claim 1, wherein the message is set to loopback when the message is sent from the first network element.

3. The method of claim 1, wherein the tunnel identification binding data identifying the first tunnel is provided in a payload of the message.

4. The method of claim 1, wherein the response includes an Internet protocol (IP) address of user equipment.

5. The method of claim 1, further comprising:
changing an endpoint of the message at a servicing general packet radio service support node or a serving gateway; and
communicating the message from the servicing general packet radio service support node or the serving gateway using the third tunnel.

6. The method of claim 1, wherein the second network element is a gateway general packet radio service support node or a packet data network gateway, and the first network element is a mobile enabled router.

7. Logic, encoded in one or more non-transitory media, that includes code for execution and, when executed by a processor, is operable to perform operations comprising:
receiving a data packet using a first tunnel;
communicating a message in the first tunnel from a first network element, in response to the receiving, the message including tunnel identification binding data identifying the first tunnel;
receiving a response to the message in a second tunnel, wherein the response contains
tunnel identification binding data that identifies a third tunnel on a backhaul link, and
identification data of a second network element;
establishing an out-of-band channel using the identification data; and
receiving instructions through the out-of-band channel to determine whether to offload the data packet from the backhaul link and whether to transmit the data packet using the first and third tunnels.

8. The logic of claim 7, wherein the message is set to loopback when the message is sent from the first network element.

9. The logic of claim 7, wherein the tunnel identification binding data identifying the first tunnel is provided in a payload of the message.

10. The logic of claim 7, wherein the response includes an Internet protocol (IP) address of user equipment.

11. The logic of claim 7, wherein the message is communicated to a servicing general packet radio service support node or a serving gateway.

12. The logic of claim 7, wherein the second network element is a gateway general packet radio service support node or a packet data network gateway, and the first network element is a mobile enabled router.

13. An apparatus, comprising:
a memory element configured to store data;
a processor operable to execute instructions associated with the data; and
a traffic offload module configured to interface with the memory element and the processor, wherein
the apparatus is configured to
communicate a message in a first tunnel, in response to receiving a data packet using the first tunnel, the message including tunnel identification binding data identifying the first tunnel;
receive a response to the message in a second tunnel, wherein the response contains
tunnel identification binding data that identifies a third tunnel on a backhaul link, and
identification data of a network element;
establish an out-of-band channel using the identification data; and
receive instructions through the out-of-band channel to determine whether to offload the data packet from the backhaul link and whether to transmit the data packet using the first and third tunnels.

14. The apparatus of claim 13, wherein the message is set to loopback when the message is sent from the apparatus.

15. The apparatus of claim 13, wherein the tunnel identification binding data identifying the first tunnel is provided in a payload of the message.

16. The apparatus of claim 13, wherein the response includes an Internet protocol (IP) address of user equipment.

17. The apparatus of claim 13, wherein the message is communicated to a servicing general packet radio service support node or a serving gateway.

18. The method of claim 1, wherein the instructions indicate a backhaul link for voice traffic.

19. The logic of claim 7, wherein the instructions indicate a backhaul link for voice traffic.

20. The apparatus of claim 13, wherein the instructions indicate a backhaul link for voice traffic.

21. The method of claim 1, wherein the response includes tunnel identification binding data that identifies a fourth tunnel.

* * * * *